United States Patent
Tzarnotzky et al.

(10) Patent No.: US 11,149,472 B1
(45) Date of Patent: Oct. 19, 2021

(54) LOCK WITH SINGLE-SIDED AUTOMATIC LOCKING

(71) Applicant: Wisk Aero LLC, Mountain View, CA (US)

(72) Inventors: Uri Tzarnotzky, Sunnyvale, CA (US); James Joseph Tighe, San Jose, CA (US)

(73) Assignee: Wisk Aero LLC, Mountain View, CA (US)

( * ) Notice: Subject to any disclaimer, the term of this patent is extended or adjusted under 35 U.S.C. 154(b) by 7 days.

(21) Appl. No.: 16/353,846

(22) Filed: Mar. 14, 2019

(51) Int. Cl.
| | |
|---|---|
| *E05B 77/54* | (2014.01) |
| *E05B 81/08* | (2014.01) |
| *E05B 81/90* | (2014.01) |
| *B64D 45/00* | (2006.01) |
| *B60R 25/01* | (2013.01) |

(52) U.S. Cl.
CPC .............. *E05B 77/54* (2013.01); *B60R 25/01* (2013.01); *B64D 45/0015* (2013.01); *E05B 81/08* (2013.01); *E05B 81/90* (2013.01); *E05Y 2900/502* (2013.01); *E05Y 2900/531* (2013.01)

(58) Field of Classification Search
CPC .................................. E05B 81/08; E05B 81/90
See application file for complete search history.

(56) References Cited

U.S. PATENT DOCUMENTS

| | | | | |
|---|---|---|---|---|
| 2005/0093305 | A1* | 5/2005 | Jackson | E05B 77/26 292/216 |
| 2009/0051173 | A1* | 2/2009 | Akizuki | E05B 77/26 292/216 |
| 2011/0133495 | A1* | 6/2011 | Jankowski | E05B 81/16 292/336.3 |
| 2011/0181051 | A1* | 7/2011 | Itami | E05B 81/20 292/2 |
| 2012/0175896 | A1* | 7/2012 | Martinez | E05B 81/06 292/199 |
| 2016/0002959 | A1* | 1/2016 | Javadzadeh | E05B 77/54 701/46 |
| 2017/0074008 | A1* | 3/2017 | Marlia | E05B 81/06 |
| 2018/0355639 | A1* | 12/2018 | Ring | E05B 77/26 |

* cited by examiner

*Primary Examiner* — Alyson M Merlino
(74) *Attorney, Agent, or Firm* — Kitpatrick Townsend & Stockton LLP

(57) ABSTRACT

A lock in a vehicle is automatically controlled based at least in part on a state associated with the vehicle. In response to an attempt to open a hatch using an interior release lever while in a locked state, the automatically-controlled lock in the locked state prevents the hatch from opening. In response to an attempt to open the hatch using an exterior release lever while the automatically-controlled lock is in the locked state, a bypass to the automatically-controlled lock is used to open the hatch.

19 Claims, 17 Drawing Sheets

LOCK WITH SINGLE-SIDED AUTOMATIC LOCKING

BACKGROUND OF THE INVENTION

New types of vehicles, including vertical takeoff and landing (VTOL) aircraft, are being developed. In some cases, these vehicles are being flown or otherwise used in new ways, for example as autonomous vehicles. As new vehicles and/or modes of use are explored, new features which are suitable for such new vehicles and/or new modes of use would be desirable. In particular, new safety features are desirable.

BRIEF DESCRIPTION OF THE DRAWINGS

Various embodiments of the invention are disclosed in the following detailed description and the accompanying drawings.

DETAILED DESCRIPTION

Figure 1:
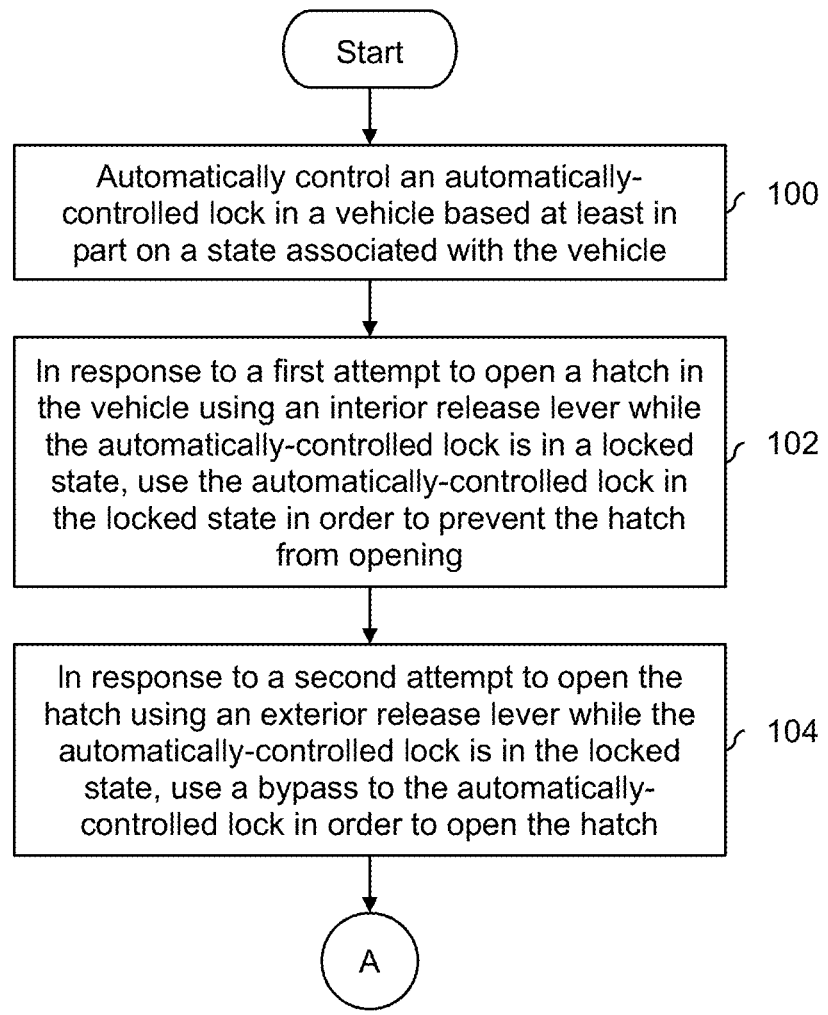
FIG. 1 is a flowchart illustrating an embodiment of a process to operate an automatically-controlled lock and an associated bypass.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a locking system for a hatch (e.g., a door, a canopy, etc.) in a vehicle are described herein. In some embodiments, at least part of the locking system is automatically controlled by the vehicle so that (as an example) an occupant of the vehicle does not need to control or otherwise manage the locking and unlocking of the hatch. For example, an automatically-controlled lock may be controlled by some component or module in the vehicle and/or based on one or more sensors (e.g., which measure or otherwise sense a state or value associated with the vehicle). In one example, the vehicle is an autonomous aircraft and the automatically-controlled lock is controlled by an autonomous flight controller in the vehicle.

In some embodiments, there is a bypass to the automatically-controlled lock. In some cases, while an interior release lever (e.g., accessible to an occupant of the vehicle) is coupled to the automatically-controlled lock (and therefore the hatch cannot be opened from the inside of the vehicle if the automatically-controlled lock is in a locked state), an exterior release lever is coupled to the bypass so that someone outside of the vehicle can always open the hatch even if the automatically-controlled lock is in a locked state. For example, if the vehicle is an aircraft, then it is not necessary to lock the vehicle from the outside while the aircraft is in flight because no one will be outside of the aircraft when it is airborne.

FIG. 1 is a flowchart illustrating an embodiment of a process to operate an automatically-controlled lock and an associated bypass. In various embodiments, the vehicle that performs the example process of FIG. 1 is a car, an aircraft, etc.

At 100, an automatically-controlled lock in a vehicle is automatically controlled based at least in part on a state associated with the vehicle. As indicated by its name, the automatically-controlled lock is automatically controlled by the vehicle (e.g., a flight controller in an aircraft which has access to various aircraft state information (e.g., ready to take off)) and is not manually controllable by a person either inside of the vehicle or outside of the vehicle. Such a vehicle will not, for example, have buttons or knobs on the inside or outside of the vehicle which the occupant can use to control the state of the automatically-controlled lock.

As will be described in more detail below, the automatically-controlled lock can be set or otherwise controlled in a variety of ways depending upon a state associated with the vehicle. For example, there may be a motor sensor that monitors the state of the motor in the vehicle. If the exemplary motor sensor reports that the motor is off or idling (e.g., on but not causing the vehicle to accelerate or takeoff), then the vehicle may have the automatically-controlled lock in an unlocked state. Once the motor sensor reports that the motor is active (e.g., causing the vehicle to accelerate or takeoff) then the vehicle may put the automatically-controlled lock into a locked state. At the end of the trip, the vehicle may unlock the automatically-controlled lock when the motor is turned off (e.g., or at some other event or state, depending upon the application and/or implementation). This is merely one example of how a state associated with the vehicle may be used to control or otherwise set the automatically-controlled lock. Other examples are described in more detail below. In some embodiments, the automatically-controlled lock has some default state (e.g., that it initializes to and/or that it will be in if there is no control signal and/or power supplied to the automatically-controlled lock).

At 102, in response to a first attempt to open a hatch in the vehicle using an interior release lever while the automatically-controlled lock is in a locked state, the automatically-controlled lock in the locked state is used in order to prevent the hatch from opening. In various embodiments, the hatch may be a door, a canopy, or other moveable panel which permits ingress and egress. In one example described in more detail below, the automatically-controlled lock includes a solenoid with an extendable pin or rod. When the pin is extended, the automatically-controlled lock is in a locked state because the extended pin prevents the hatch from opening via the interior release lever. For example, the vehicle may be moving and it may be dangerous for the occupant to open the hatch and/or try to get out of the vehicle.

At 104, in response to a second attempt to open the hatch using an exterior release lever while the automatically-controlled lock is in the locked state, a bypass to the automatically-controlled lock is used in order to open the hatch. For example, in an emergency, it may be important for a person outside of the vehicle to be able to open the hatch. The bypass permits a person outside of the vehicle to open the hatch by bypassing the automatically-controlled lock using the exterior release lever. In other words, the automatically-controlled lock is not necessarily unlocked for a person outside of the vehicle to open the hatch. Rather, the exterior release lever is not locked out or otherwise limited by the state of the automatically-controlled lock.

It may be helpful to walk through one example from takeoff to landing. At the beginning, the passenger starts outside of the aircraft with the canopy closed. The vehicle is opened using the exterior latch. As will be described in more detail below, the exterior latch always works with and without power (at least in this example) and also regardless of the state of the lockout (i.e., whether the system is in a locked state or an unlocked state). The canopy is then closed (e.g., by the passenger from inside the vehicle or by a crew member outside of the vehicle). The canopy automatically latches shut (e.g., using a mechanical system which does this without power, just like a car door). The motors are placed in an operable state by the flight control system (e.g., power is supplied and/or the electrical system is turned on), and the flight control system locks out the primary interior passenger release lever (i.e., the system is (automatically) put into a locked state). This is one example of step 100. Note that the motors and/or propellers are not necessarily turning at this point, they just have the power necessary to function. During this time, if the occupant tries to open the hatch using the interior release lever, they would not be able to (see step 102). However, if someone outside of the vehicle tried to open the hatch using the exterior release lever they would be able to even if the system is in a locked state (see step 104). The aircraft then flies to some desired destination and lands. After landing, the motors and/or propellers are placed in an inoperable state by the flight control system (e.g., power is no longer supplied and/or the electrical system is turned off) and the flight control system (automatically) unlocks the system; this is another example of step 100. The passenger then opens the canopy using an interior release lever. If the interior release lever fails (i.e., the passenger is unable to open the canopy with the primary release lever), then (as will be described in more detail below) the passenger unbuckles themselves (e.g., so that they can reach an interior emergency release lever) and opens the canopy with the interior emergency release lever. Alternatively, an external ground crew member can open the canopy using the external release lever (e.g., both the interior emergency release lever and the exterior release lever bypass the lockout).

In some embodiments, this type of locking system is used in an autonomous vehicle. The automatic nature of the lock may be attractive because it ensures that the door or other hatch is locked without requiring intervention from the passenger. For example, a passenger that summons an autonomous vehicle may be on their smartphone when they enter the vehicle and forget to lock the door. An automatically-controlled lock ensures that the door or other hatch is secured even if the occupant forgets and for safety reasons is desirable and/or attractive.

The following figures describe an example where one or more sensors in the vehicle are used to control the automatically-controlled lock.

Figure 2A:
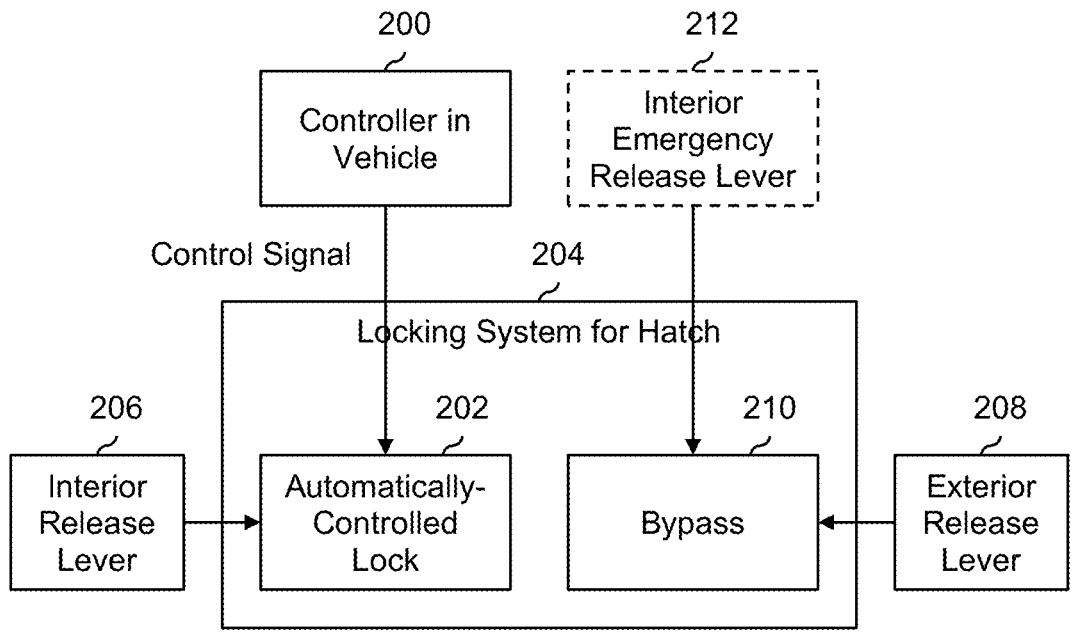
FIG. 2A is a diagram illustrating an embodiment of a locking system in a vehicle where one or more sensors in the vehicle are used to control an automatically-controlled lock.

FIG. 2A is a diagram illustrating an embodiment of a locking system in a vehicle where one or more sensors in the vehicle are used to control an automatically-controlled lock. This diagram shows one example of a system that performs the process of FIG. 1. A controller in a vehicle (200) is used to generate a control signal which controls an automatically-controlled lock (202) in a locking system for a hatch (204). For example, the controller may receive inputs from one or more sensors in the vehicle which measure various states and/or characteristics associated with the vehicle as a whole or with specific parts or components in the vehicle. For example, a motor sensor may track or otherwise monitor whether the motor is active (e.g., causing the vehicle to accelerate), inactive (e.g., off or idling), turned off, etc. Other example sensors include accelerometers, altimeters, etc. Controller 200 shows an example of a component that performs step 100 in FIG. 1 (i.e., automatically controls an automatically-controlled lock in a vehicle). When the controller detects certain conditions and/or states from the sensor information, the control signal to the automatically-controlled lock is updated accordingly.

Interior release lever 206 is disposed on the interior of the vehicle. In one example described in more detail below, the vehicle is a two-occupant vehicle and interior release lever 206 is located between the two seats so that a single interior release lever can be shared by the two occupants (e.g., keeping parts and weight down). The interior release lever (206) is coupled to the automatically-controlled lock (202). As such, the interior release lever (206) cannot open the hatch (not shown) unless the automatically-controlled lock (202) is in an unlocked state. The interior release lever (206) and automatically-controlled lock (202) shown here are an example of the components related to step 102 in FIG. 1.

In contrast, the exterior release lever (208) is coupled to bypass (210) which (e.g., mechanically) bypasses or otherwise circumvents automatically-controlled lock (202). As such, even if automatically-controlled lock (202) is in a locked state, the exterior release lever can be used to open the hatch (not shown) from the exterior of the vehicle. These are some examples of components related to step 104 in FIG. 1. In some embodiments, there is an (e.g., optional) interior emergency release lever (212) which is coupled to the bypass (210). For example, such a lever may permit an occupant of the vehicle to open the hatch even if the lock (202) is in a locked state.

The following figure shows one example where the state of an automatically-controlled lock is based on the state of a motor (not shown).

Figure 2B:
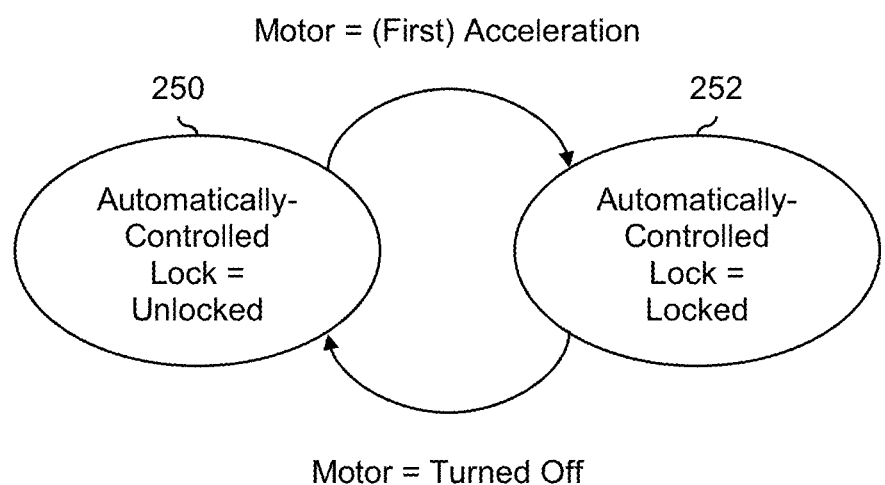
FIG. 2B is a diagram illustrating an embodiment of a state machine where the state of the automatically-controlled lock is based at least in part on the state of a motor in the vehicle.

FIG. 2B is a diagram illustrating an embodiment of a state machine where the state of the automatically-controlled lock is based at least in part on the state of a motor in the vehicle. In some embodiments, controller 200 in FIG. 2A keeps track of which state (e.g., in the state machine shown here), the system is in.

In this example, the automatically-controlled lock initializes to and/or starts out in an unlocked state (250). For example, during this time, an occupant of the vehicle may get into the vehicle via the door, canopy, or other type of hatch.

Once the motor sensor (not shown) reports that the motor is performing its (e.g., first) acceleration, the automatically-controlled lock moves to a locked state (252). For example, in an aircraft this may correspond to detecting a takeoff and locking the automatically-controlled lock. Or, in a car, this may correspond to locking the automatically-controlled lock when the car begins moving. During the course of the vehicle's trip and/or flight, the automatically-controlled lock will remain in the locked state (252) until the motor sensor reports that the motor has been turned off. With the automatically-controlled lock in the locked state, an occupant of the vehicle cannot open the hatch while it is potentially dangerous to do so.

Once the motor sensor reports that the motor has been turned off, the automatically-controlled lock returns to the unlocked state (250). At this point it is assumed that it is generally safe for the hatch to be opened because (as examples) the vehicle has stopped moving, the vehicle is on the ground (e.g., if the vehicle is an aircraft), and/or the propellers are stopped or nearly stopped (e.g., if the vehicle is an aircraft with propellers).

This is merely one example of what type of sensors may be used and how the reported state information may be used to control the automatically-controlled lock. Naturally, the specific implementation may depend upon the particular application, vehicle, and/or related (e.g., safety) concerns.

This example is described more generally and/or formally in a flowchart below.

Figure 3:
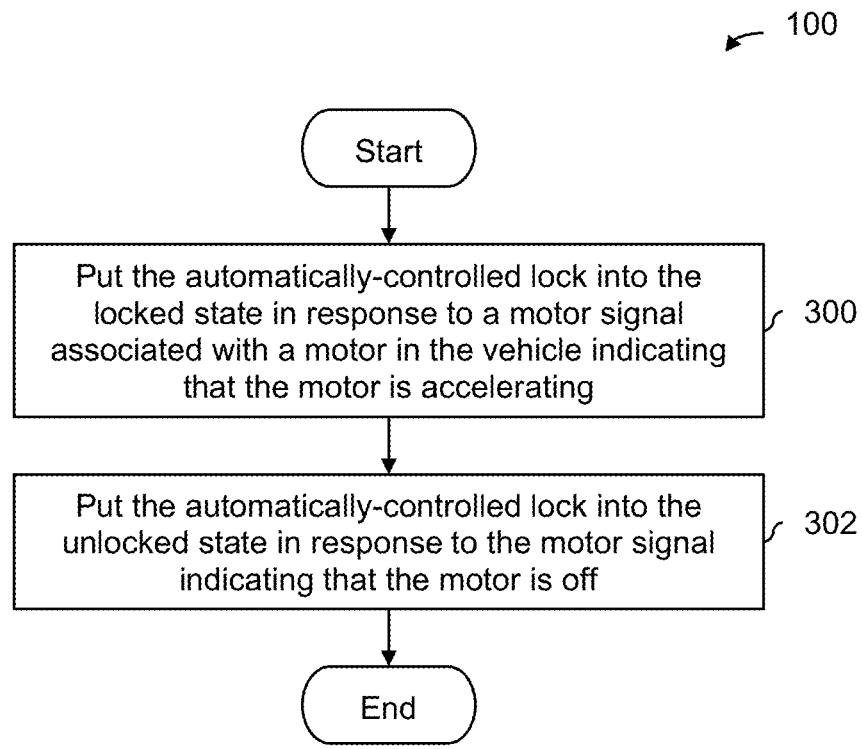
FIG. 3 is a flowchart illustrating an embodiment of a process to automatically control an automatically-controlled lock.

FIG. 3 is a flowchart illustrating an embodiment of a process to automatically control an automatically-controlled lock. In some embodiments, the example process shown here is used at step 100 in FIG. 1.

At 300, the automatically-controlled lock is put into the locked state in response to a motor signal associated with a motor in the vehicle indicating that the motor is accelerating. For example, in FIG. 2B, this corresponds to going from unlocked state 250 to locked state 252 when the aircraft takes off or a car starts moving. The automatically-controlled lock then remains in locked state 252 in FIG. 2B until the trip or flight is over and the motor is turned off (at least in this example).

At 302, the automatically-controlled lock is put into the unlocked state in response to the motor signal indicating that the motor is off. For example, once the motor is turned off, it may be safe for the occupant of the vehicle to exit the vehicle and/or for the hatch to be opened (e.g., whereas if the hatch were opened at high speeds then the occupant could be injured and/or the vehicle could be damaged).

In another example, the vehicle is an aircraft and is more specifically an autonomous aircraft. The following figure describes one such example where the autonomous flight controller controls the automatically-controlled lock (e.g., based on a state that the autonomous flight controller is in) and the automatically-controlled lock includes a solenoid with a pin.

Figures 4A, 4B:
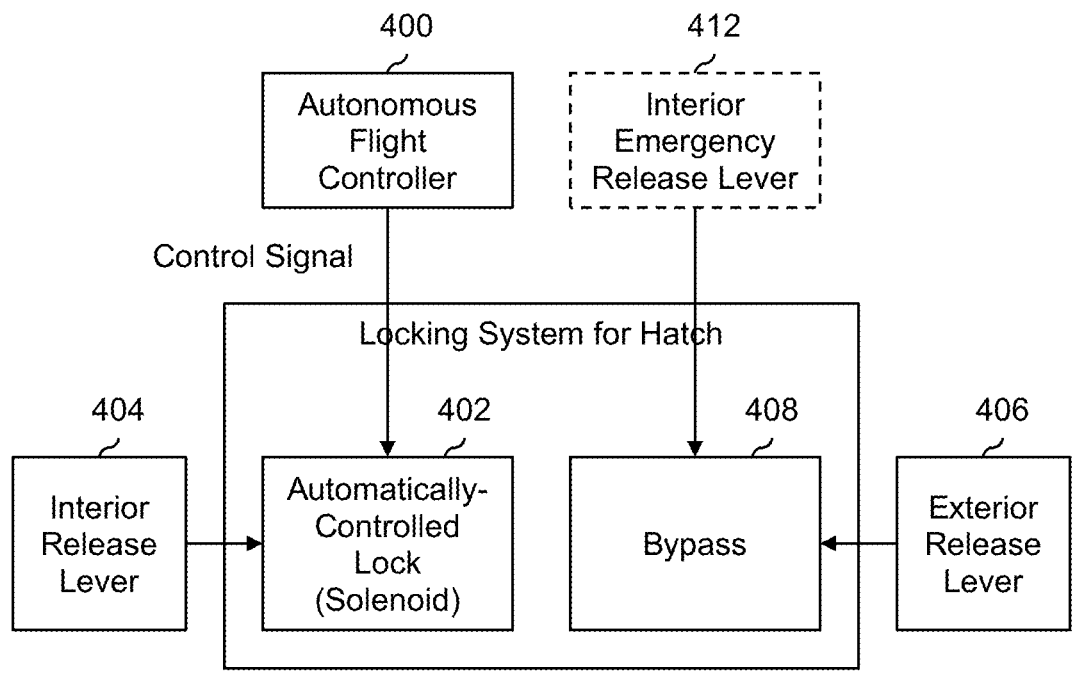
FIG. 4A is a diagram illustrating an embodiment of a locking system in an autonomous aircraft where the automatically-controlled lock includes a solenoid with a pin.
FIG. 4B is a diagram illustrating an embodiment of autonomous flight controller states, control signals generated by the autonomous flight controller based on the state of the autonomous flight controller, and the resulting state of an automatically-controlled lock that includes a solenoid.

FIG. 4A is a diagram illustrating an embodiment of a locking system in an autonomous aircraft where the automatically-controlled lock includes a solenoid with a pin. In this example, the vehicle is an autonomous aircraft which includes an autonomous flight controller (400). The autonomous flight controller generates a control signal for the automatically-controlled lock (402), based at least in part on the state that the autonomous flight controller is in (at least in this example). As before, the interior release lever (404) will not be able to open the hatch (not shown) if the automatically-controlled lock is in a locked state, but the exterior release lever (406) will be able to open the hatch because it goes through the bypass (408) and not the automatically-controlled lock (402). In some embodiments, there is an (optional) interior emergency release lever (412) via which an occupant can bypass the lock and open the hatch from the inside, even if the lock (402) is in a locked state.

FIG. 4B is a diagram illustrating an embodiment of autonomous flight controller states, control signals generated by the autonomous flight controller based on the state of the autonomous flight controller, and the resulting state of an automatically-controlled lock that includes a solenoid. FIG. 4B continues the example of FIG. 4A. The automatically-controlled lock (402) in FIG. 4a includes a solenoid (not shown) with a pin or rod that extends to lock the hatch (not shown). In this example, the solenoid has a spring so that the pin or rod is extended by default unless the solenoid is supplied with power and generates a magnetic field which retracts the pin into the solenoid.

In the table shown, the leftmost column (450) shows example states that the autonomous flight controller goes through, the center column (452) shows the corresponding control signal that is generated by the autonomous flight controller during those state(s), and the rightmost column (454) shows the resulting state of the automatically-controlled lock (including the solenoid) as a result of that control signal value.

In this example, when the autonomous flight controller is in the pre-flight, takeoff, cruising, or landing states (see row 460), no power is supplied to the solenoid (e.g., as part of or as a result of the control signal). As described above, because the solenoid has a spring, the pin will be extended (even though the solenoid is not powered) and so the automatically-controlled lock will be in the locked state.

During the post-flight state of the autonomous flight controller (see row 462), for example when the propellers are off, the control signal will include or cause power to be supplied to the solenoid so that the solenoid can generate a magnetic field to retract the pin. This causes the automatically-controlled lock to be in an unlocked state. For example, during the post-flight state, it is assumed that the aircraft is on the ground, the propellers are off, and/or it is generally safe to open the hatch and/or permit an occupant to exit the aircraft.

Row 464 shows what happens during an emergency power loss. In this state, no power is supplied to the solenoid so that the automatically-controlled lock is in a locked state. For example, if the vehicle is flying and there is an emergency power loss, it would be unsafe for the hatch to open (e.g., the hatch may be configured to spring open if the automatically-controlled lock is not in a locked state). This ensures that the hatch remains closed even in the event of a power loss or other emergency.

As described above, one benefit of using a solenoid with a spring (as described above) is that the automatically-controlled lock can be operated in a very power efficient manner. Instead of having to supply power to the solenoid most of the time (i.e., power must be supplied in order to keep the pin extended and the lock in a locked state), the solenoid is infrequently supplied with power (e.g., only when the automatically-controlled lock needs to be unlocked, such as at the end of a trip or a flight when an occupant needs to exit the vehicle). As described above, another benefit is that the lock will remain locked even if there is an unexpected loss of power (but the vehicle is still moving and/or it is still unsafe to open the hatch).

As will be described in more detail below, in some embodiments there is an emergency interior release lever inside the vehicle so that an occupant can unlock the automatically-controlled lock in the event of an emergency (e.g., time has elapsed since a loss of power and it is safe to exit the vehicle because it has had a chance to slow down). For example, such an emergency lever may be coupled to the bypass of the automatically-controlled lock (e.g., similar to the exterior release lever).

This example is described more generally and/or formally in a flowchart below.

Figure 5:
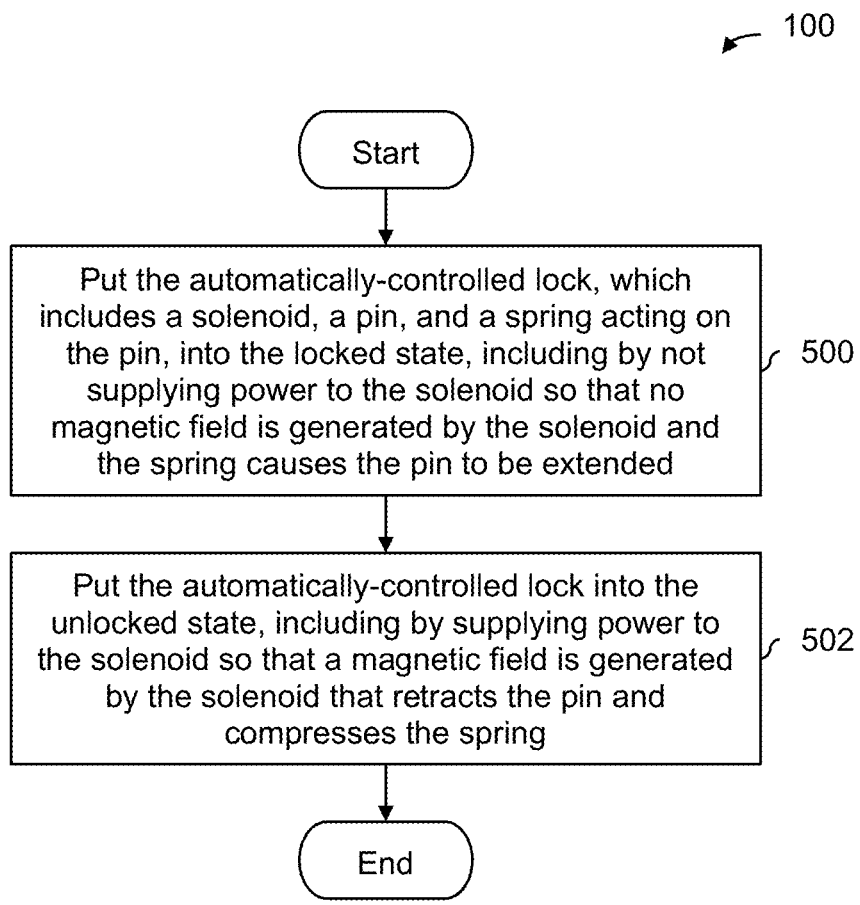
FIG. 5 is a flowchart illustrating an embodiment of a process to automatically control an automatically-controlled lock which includes a solenoid with an extendable pin.

FIG. 5 is a flowchart illustrating an embodiment of a process to automatically control an automatically-controlled lock which includes a solenoid with an extendable pin. In some embodiments, the example process shown here is used at step 100 in FIG. 1.

At 500, the automatically-controlled lock, which includes a solenoid, a pin, and a spring acting on the pin, is put into the locked state, including by not supplying power to the solenoid so that no magnetic field is generated by the solenoid and the spring causes the pin to be extended. See, for example, rows 460 and 464 in FIG. 4B. When the power is off, the only force acting on the pin is the spring force from the spring which causes the pin to extend and lock the lock. As described above, by including a spring, the solenoid-implemented lock can be operated in a power efficient manner which may be attractive if the vehicle is an electric vehicle (e.g., more power is available to extend the range of the vehicle).

At 502, the automatically-controlled lock is put into the unlocked state, including by supplying power to the solenoid so that a magnetic field is generated by the solenoid that retracts the pin and compresses the spring. See, for example, row 462 in FIG. 4B. The solenoid (which is powered in this case) generates a magnetic field that retracts the pin (e.g., into the coils of the solenoid and compressing the spring) so that the lock is unlocked.

It may be helpful to illustrate a specific example. The following figures show drawings that are specific to an exemplary electric vertical takeoff and landing (VTOL) aircraft which uses an exemplary combination of features and/or techniques described herein. Naturally, some other embodiments may employ some other combination of features and/or techniques.

Figure 6A:
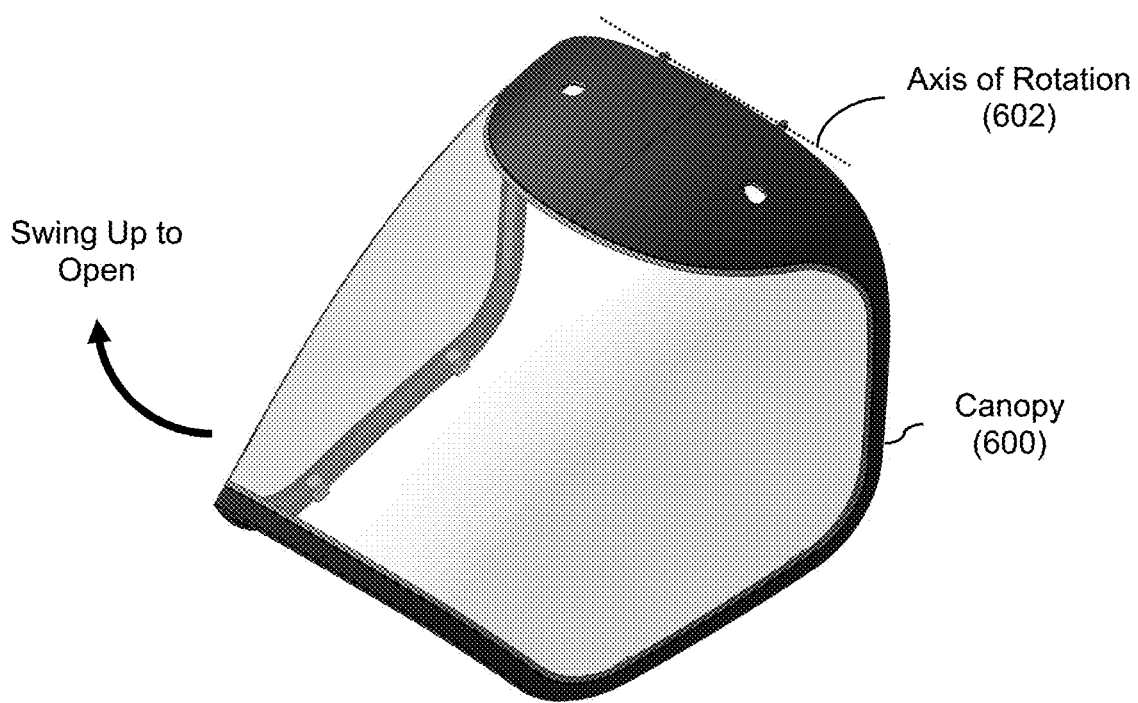
FIG. 6A is a diagram illustrating an embodiment of a canopy of an aircraft.

FIG. 6A is a diagram illustrating an embodiment of a canopy of an aircraft. In this example, occupants of the aircraft enter and exit the aircraft via the canopy (600) as opposed to a door or other type of hatch. To open the hatch and permit ingress and egress, the canopy (600) swings up, pivoting around an axis of rotation (602) at the top of the canopy where the canopy is coupled to the fuselage via hinges. In this example, the vehicle is a two-seater aircraft and so the width of the canopy is wide enough to fit two seats.

Figure 6B:
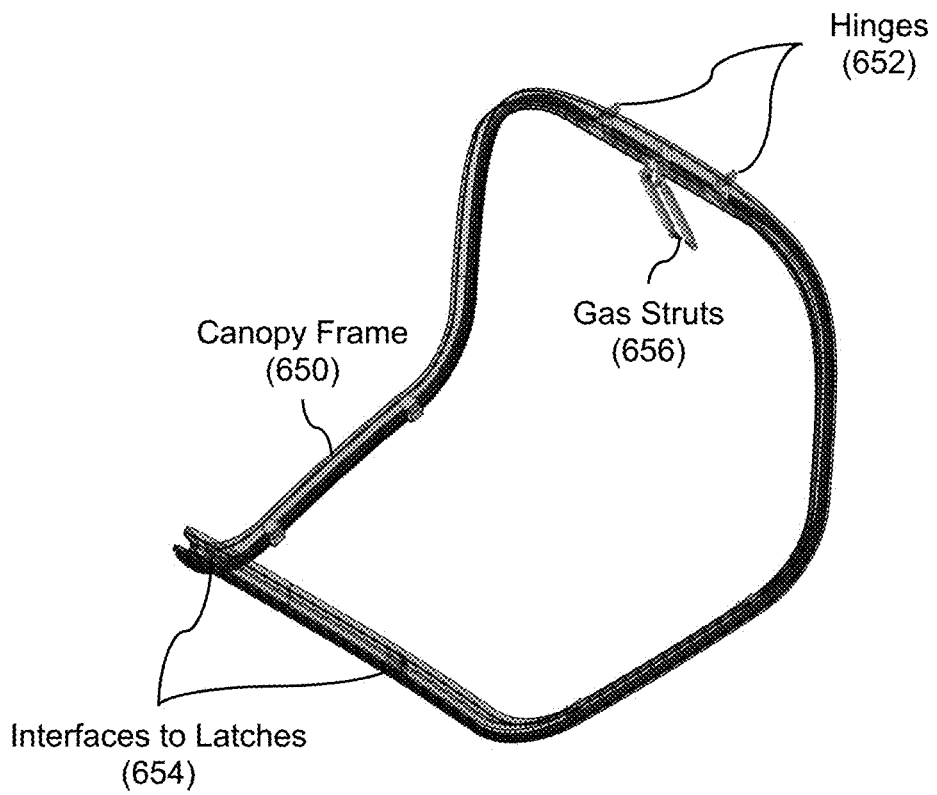
FIG. 6B is a diagram illustrating an embodiment of a canopy frame.

FIG. 6B is a diagram illustrating an embodiment of a canopy frame. FIG. 6B continues the example of FIG. 6A and shows the canopy frame (650). In this example, the canopy frame (650) has two hinges (652) that are located at the top of the canopy frame where the canopy is connected to the fuselage. At the bottom of the canopy frame (e.g., towards the nose of the aircraft), there are two locations (654) where two latches in the fuselage (not shown) grab onto the canopy frame and hold the canopy closed when the canopy is swung down. The following figure shows an example of the latches in the fuselage that hold the canopy frame at interfaces 654. Gas struts 656 push open the canopy when the latches in the fuselage release their hold on the canopy's frame.

Figure 7:
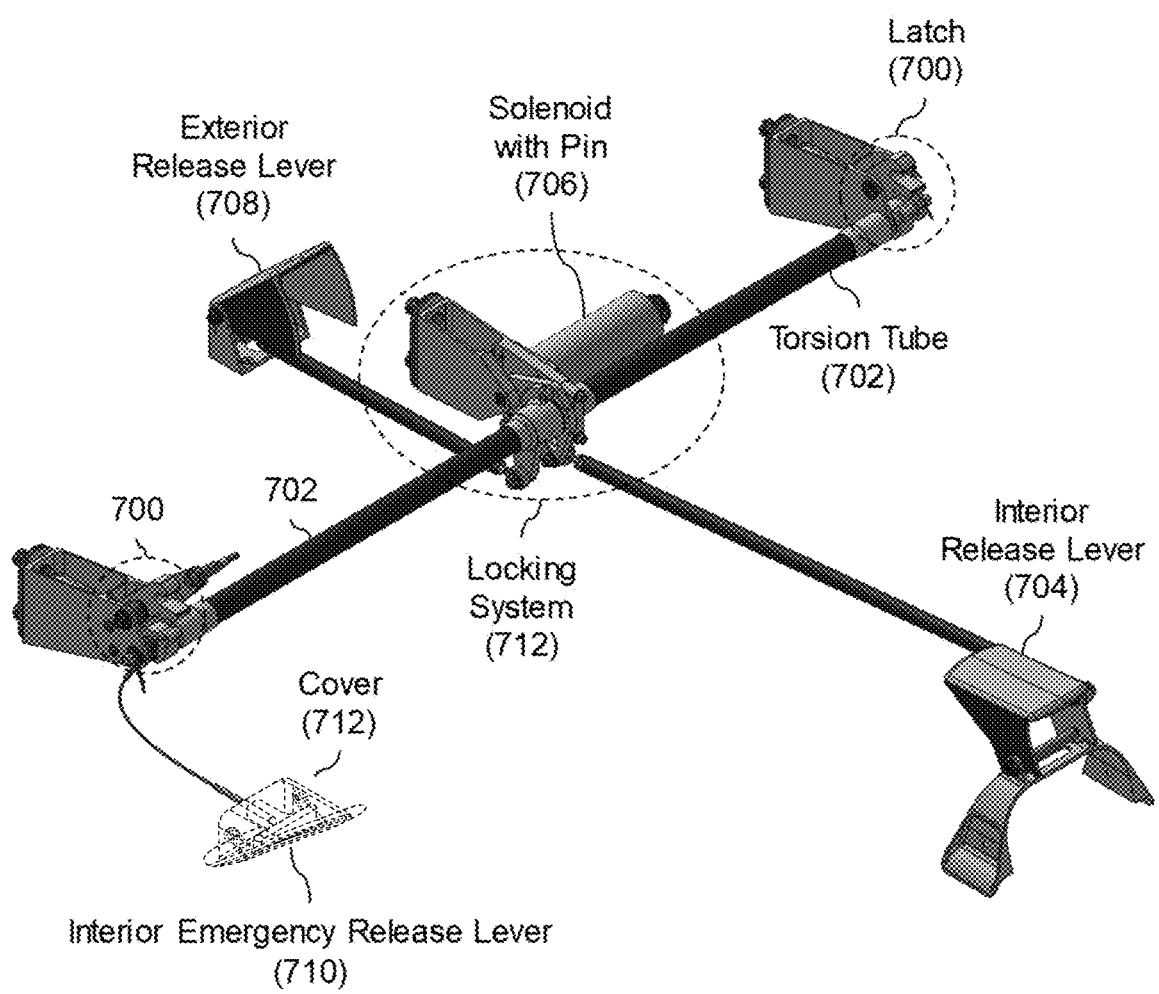
FIG. 7 is a diagram illustrating an embodiment of parts of a fuselage that are used to latch, lock, and open a canopy in an aircraft.

FIG. 7 is a diagram illustrating an embodiment of parts of a fuselage that are used to latch, lock, and open a canopy in an aircraft. FIG. 7 continues the example from FIG. 6B. For context, latches 700 in this figure grab the canopy frame at position 654 in FIG. 6B when the canopy is swung down and closed. In this example, the two latches (700) operate independently of each other. That is, it is possible for one latch to be holding on to the canopy frame while the other side of the canopy frame is not (e.g., completely) secured by its latch. Each latch is designed to be able to securely hold the canopy closed even if the other latch is not holding onto the canopy frame.

To release the latches (700) when the canopy (not shown) is closed, the corresponding torsion tube (702) needs to be rotated. In this example, both torsion tubes are coupled together and rotate together since it is not necessary to release one latch but not the other latch. As will be described in more detail below, the interior release lever (704) is coupled to the torsion tubes (702) via the solenoid (706) so that the solenoid's pin can lock out the interior release lever when the lock is in a locked state (i.e., the pin is extended). That is, pulling on the interior release lever (704) will not cause the torsion tubes (702) to rotate and release the latches (700) when the solenoid-implemented lock is locked.

In contrast, the exterior release lever (708) and interior emergency release lever (710) are connected to the torsion tubes (702) via a different part of the locking system (712), namely the bypass (described in more detail below) of the solenoid. Thus, even if the solenoid's pin is extended (i.e., the automatically-controlled lock is in a locked state), the exterior release lever (708) and interior emergency release lever (710) can rotate the torsion tubes so that the latches can be released and the canopy opens. The interior emergency release lever (710) in this example has a cover (712) which must be broken before the interior emergency release lever can be pulled.

For context, the exterior release lever (708) is located on the exterior of the aircraft near the nose. The interior release lever (704) is located between the two seats of the aircraft in the cockpit. For example, this makes the interior release lever accessible to both occupants of the exemplary two-seater aircraft and eliminates the need for a second interior release lever (which keeps weight down).

Similarly, the interior emergency release lever (710) is located inside the cockpit at a location that is accessible to both occupants of the aircraft so that a single emergency lever is sufficient for both occupants. In the exemplary aircraft, the interior emergency release lever is out of arm's reach from the occupants. For example, it is located on a forward bulkhead and occupants must take off their seatbelts and get out of their seats in order to break the cover (712) and pull the interior emergency release lever (710). This may be a safety feature to prevent casual and/or accidental usage of the emergency release lever.

As shown here, in some embodiments, there is an interior emergency release lever via which an occupant of the vehicle can bypass the automatically-controlled lock in order to open the hatch. The following flowchart describes this more formally and/or generally.

Figure 8:
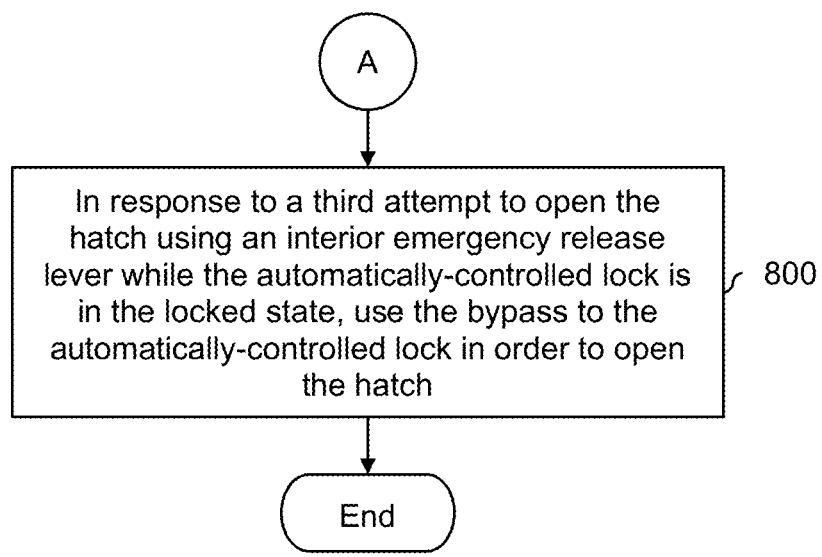
FIG. 8 is a flowchart illustrating an embodiment of a process to open a hatch using an interior emergency release lever.

FIG. 8 is a flowchart illustrating an embodiment of a process to open a hatch using an interior emergency release lever. In some embodiments, the process of FIG. 8 is performed in combination with the process of FIG. 1.

At 800, in response to a third attempt to open the hatch using an interior emergency release lever while the automatically-controlled lock is in the locked state, the bypass to the automatically-controlled lock is used in order to open the hatch. For example, in FIG. 7, both the exterior release lever (708) and the interior release lever (704) can bypass or otherwise circumvent the solenoid with the pin (706) to open the hatch, even if the solenoid-implemented lock is in the locked state.

Returning briefly to FIG. 7, the following figures describe the solenoid with the extendable pin (706) in more detail.

Figure 9A:
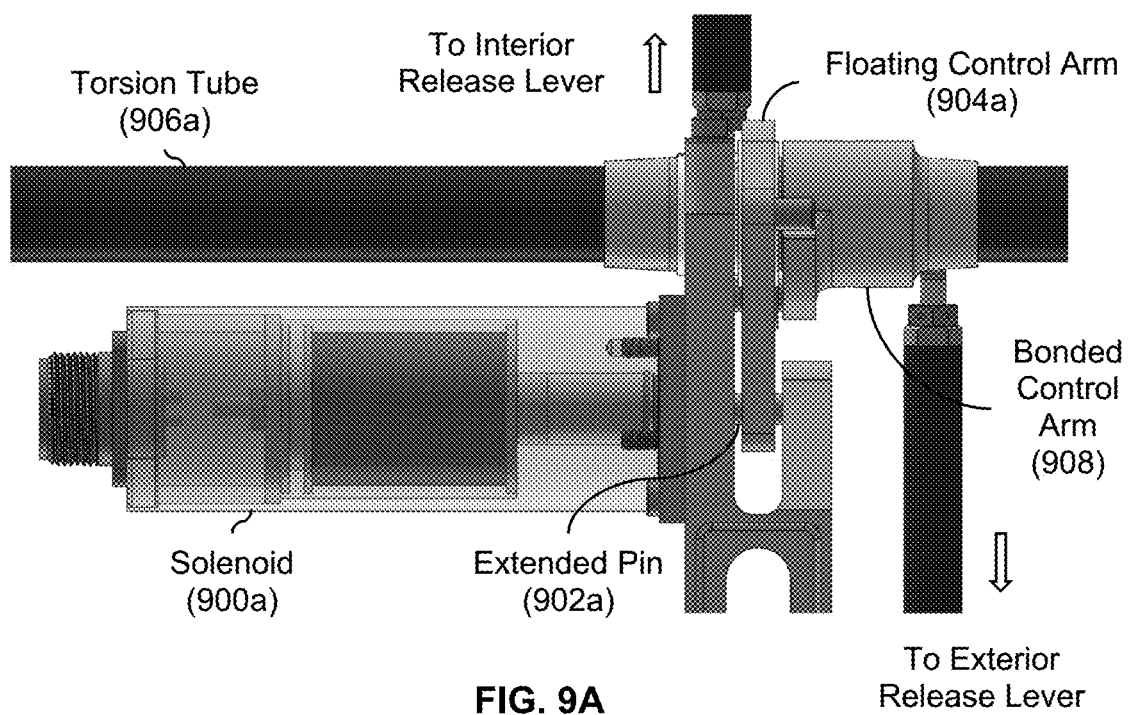
FIG. 9A is a diagram illustrating a top view of an embodiment of a solenoid-implemented lock in a locked state with the pin extended.

FIG. 9A is a diagram illustrating a top view of an embodiment of a solenoid-implemented lock in a locked state with the pin extended. In the example shown, the solenoid (900a) is in a state where the pin (902a) is extended. With the pin (902a) extended as shown, if an occupant of the vehicle were to pull on the interior release lever (not shown), the control arm (904a), a floating one in this example, would begin to rotate (e.g., with the distal end rotating into the page) but the distal end of the floating control arm would soon be blocked by the extended pin (902a). This, in turn, would prevent the torsion tube (906a) from rotating, which in turn would prevent the hatch (not shown) from opening. In contrast, the bonded control arm (908) is bonded (e.g., directly) to the torsion tube (906a) and is not locked out by the extended pin (902a). This permits the hatch to be opened via the exterior release lever even if the solenoid-implemented lock is in a locked state.

Figure 9B:
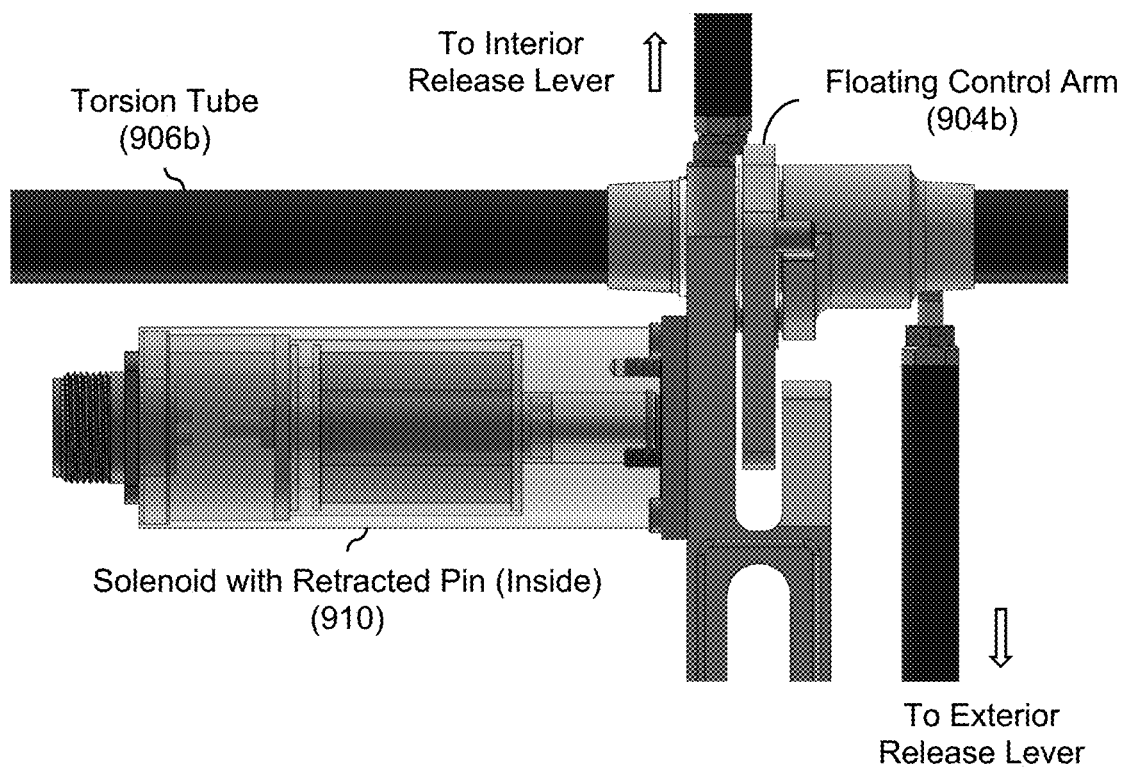
FIG. 9B is a diagram illustrating a top view of an embodiment of a solenoid-implemented lock in an unlocked state with the pin retracted.

FIG. 9B is a diagram illustrating a top view of an embodiment of a solenoid-implemented lock in an unlocked state with the pin retracted. In this state, the pin is retracted into the solenoid (910) and is not visible from the view shown here. With the pin retracted, the floating control arm (904b) can freely rotate in response to a pulling action on the interior release level. The rotation of the floating control arm (904b), now unobstructed by the pin, in turn will cause the torsion tube (906b) to rotate which will cause the hatch to (spring) open.

Figure 9C:
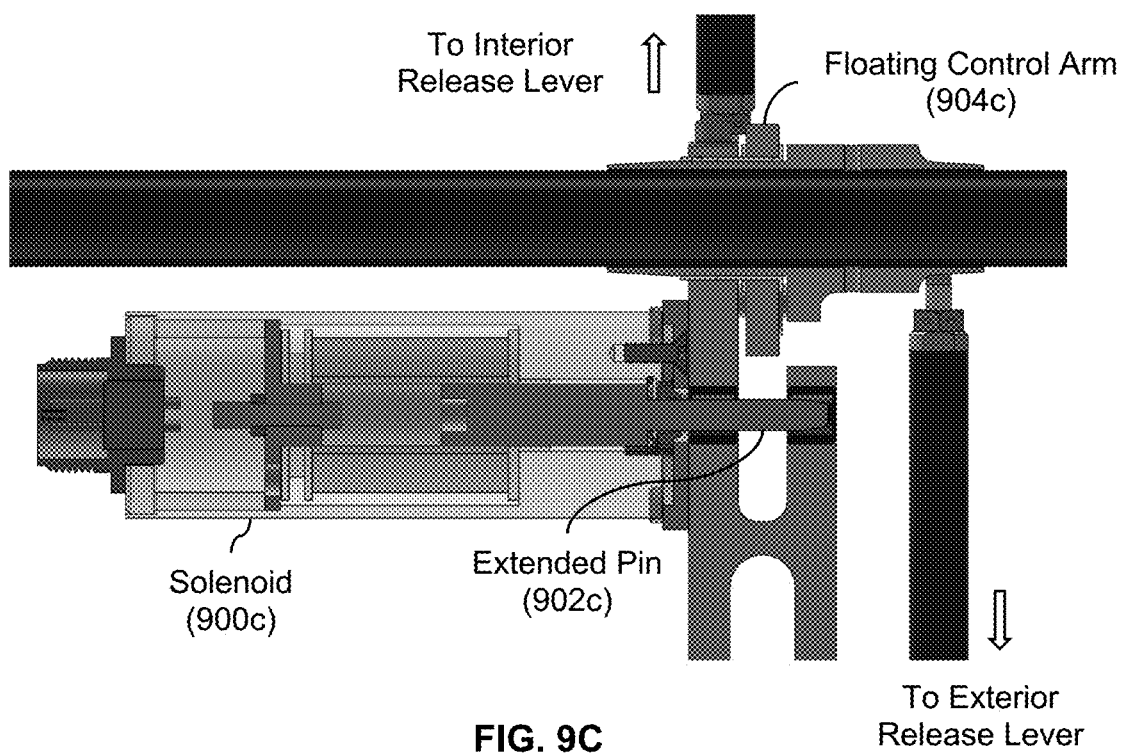
FIG. 9C is a diagram illustrating a cross-sectional view of an embodiment of a solenoid-implemented lock in a locked state with the pin extended.

FIG. 9C is a diagram illustrating a cross-sectional view of an embodiment of a solenoid-implemented lock in a locked state with the pin extended. FIG. 9C is in the same state as that shown in FIG. 9A. With the top half of the solenoid (900c) and the floating control arm (904c) removed, the extended pin (902c), which always resides at least partially inside of the body of the solenoid, can be better seen. It is noted that the missing top-half of the distal end of the floating control arm (904c), which is not shown here, is the portion of the floating control arm which would make contact with the extended pin.

Figure 9D:
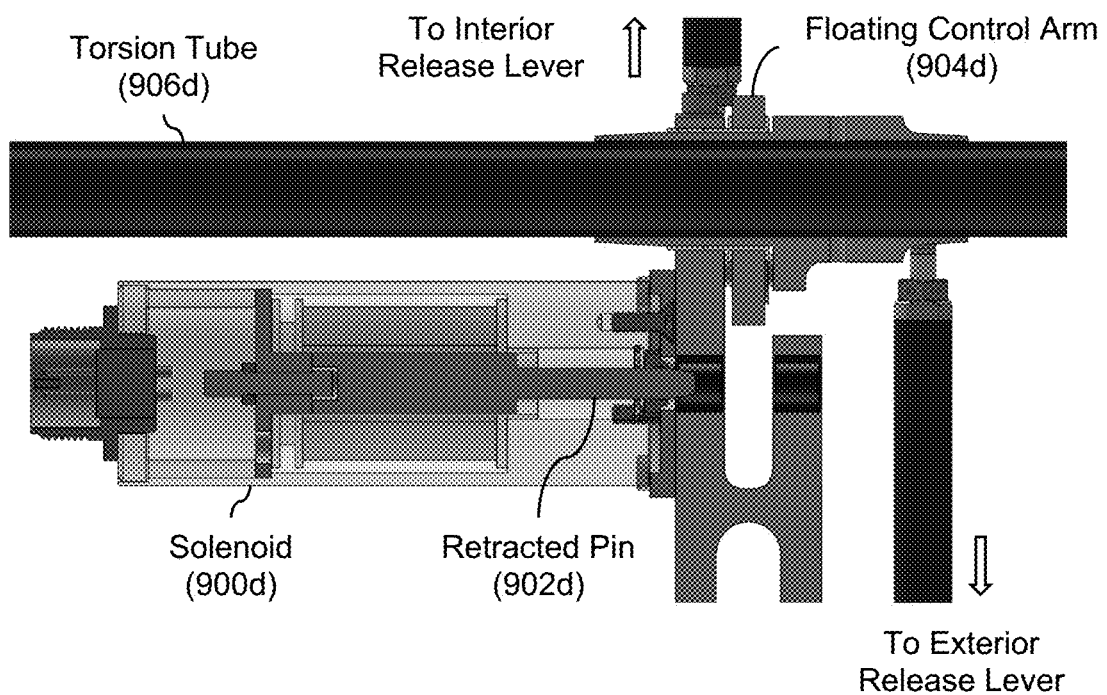
FIG. 9D is a diagram illustrating a cross-sectional view of an embodiment of a solenoid-implemented lock in an unlocked state with the pin retracted.

FIG. 9D is a diagram illustrating a cross-sectional view of an embodiment of a solenoid-implemented lock in an unlocked state with the pin retracted. FIG. 9D is in the same state as that shown in FIG. 9B. In this view, the pin (902d) which has been retracted into the body of the solenoid (900d) is more visible. With the pin retracted, the floating control arm (904d) can freely rotate in response to the interior release lever being pulled so that the torsion tube (906d) can rotate and the hatch can be opened from the inside of the vehicle.

Next, the following figures show how the latch (e.g., 700 in FIG. 7) closes and opens.

Figure 10A:
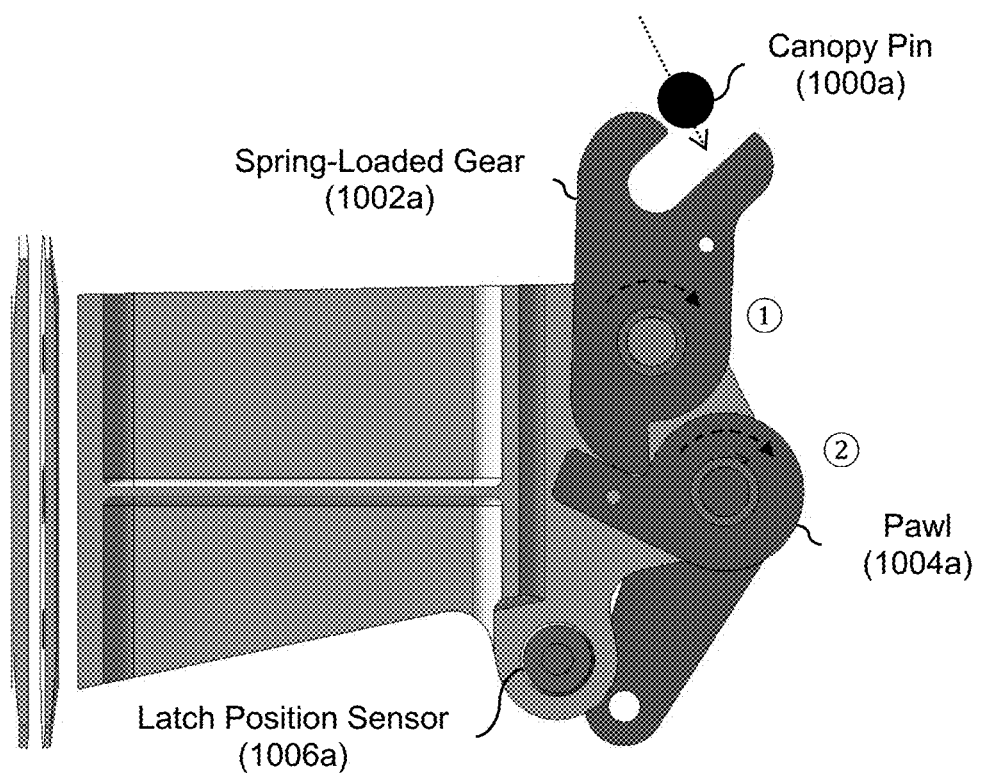
FIG. 10A is a side-view diagram illustrating an embodiment of a latch in an open position prior to closure of a hatch.
Figure 10B:
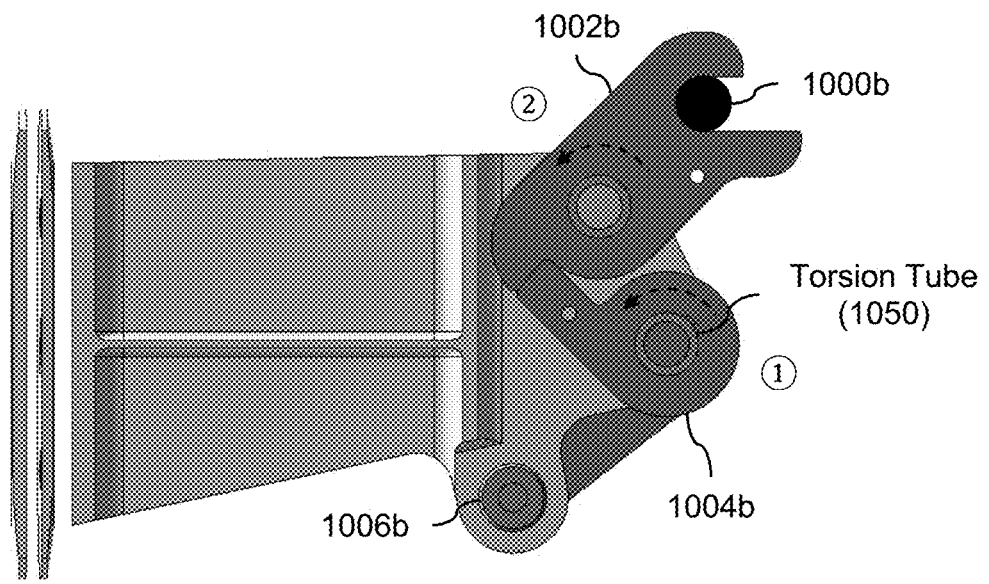
FIG. 10B is a side-view diagram illustrating an embodiment of a latch in a closed position prior to opening a hatch.

FIG. 10A is a side-view diagram illustrating an embodiment of a latch in an open position prior to closure of a hatch. FIG. 10A and FIG. 10B show a zoomed in side view of latch 700 from FIG. 7. In the state shown in FIG. 10A, a canopy is in the process of closing. A pin (1000a), which is part of the canopy's frame, is descending along the path shown.

When the canopy pin hits spring-loaded gear (1002*a*), more specifically, the U-shaped receptor portion of the gear, the gear will rotate in a clockwise direction (from the view shown here). Once the gear has rotated to a sufficient degree, the pawl (1004*a*) is similarly permitted to rotate in a clockwise direction. The following figure shows the latch when the canopy is closed (i.e., secured by the latch).

FIG. 10B is a side-view diagram illustrating an embodiment of a latch in a closed position prior to opening a hatch. In this state, the canopy latch is held down by the gear (1002*b*) so that the canopy is securely closed. To open the latch and release the canopy, a torsion tube (1050) on the other side of the pawl (1004*b*) needs to be rotated in the counterclockwise direction (from the view shown here). Once the pawl has rotated to a sufficient degree, the spring action of the gear (1002*b*) will cause the gear to rotate in a counterclockwise direction. The canopy (not shown) will spring open once the opening of the U-shaped portion of the gear is pointing sufficiently upwards. For example, the gas struts (656) in FIG. 6B will push the canopy open and upwards.

To detect when the latch (or, more specifically, the pawl) is in the open position shown in FIG. 10A versus the closed position shown in FIG. 10B, the example system shown here includes a latch position sensor (1006*a* in FIG. 10A and 1006*b* in FIG. 10B). In some embodiments, the sensor is a Hall effect sensor that detects when the extended portion of the pawl is not adjacent to the sensor (see sensor 1006*a* and pawl 1004*a* in FIG. 10A) and the latch is in the open position versus when the pawl is adjacent to the sensor (see 1006*b* and 1004*b* in FIG. 10B) and the latch is in the closed position. As will be described in more detail below, in some embodiments, this information is passed on to some controller (e.g., an autonomous flight controller that uses the information to decide if the aircraft is safe and/or ready to perform an autonomous takeoff).

In some embodiments, an interior release lever (e.g., 704 in FIG. 7) does not backdrive the latches (e.g., 700 in FIG. 7) or at least the part of the latches that comes into contact with the canopy (frame). For example, to prevent damage to the canopy pin when the canopy is being closed, when the interior release lever is pulled, the U-shaped portion of the gear will face upwards so that the gear is in a receiving or open position (see gear 1002*a* in FIG. 10A) and cannot damage the canopy pin by being in a closed position (see gear 1002*b* in FIG. 10B).

The following figures show examples of the gear (which holds the canopy closed) responding to an exterior release lever and an interior release lever in various states.

Figure 11A:
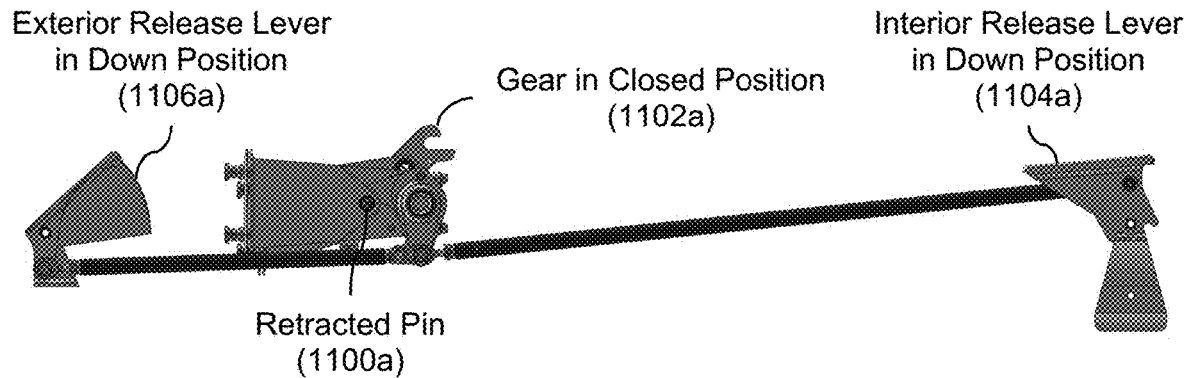
FIG. 11A is a diagram illustrating an embodiment of a side view of a locking system with an interior release lever and an exterior release lever in a down position.

FIG. 11A is a diagram illustrating an embodiment of a side view of a locking system with an interior release lever and an exterior release lever in a down position. In this example and the following examples, the pin is retracted (1100*a*) so that the solenoid-implemented lock is in an unlocked state. The gear (e.g., which holds the canopy pin down, keeping the canopy closed) is in a closed position (1102*a*) with the U-shaped receptor facing sideways. Both the interior release lever (1104*a*) and the exterior release lever (1106*a*) are in a down position (i.e., no one is trying to open the canopy).

Figure 11B:
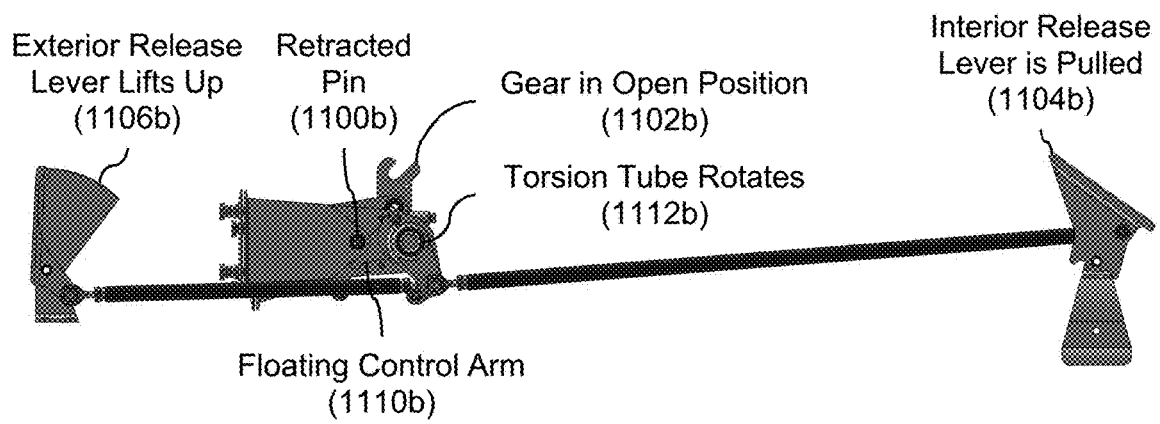
FIG. 11B is a diagram illustrating an embodiment of a side view of a locking system and an exterior release lever responding to an interior release lever being pulled.

FIG. 11B is a diagram illustrating an embodiment of a side view of a locking system and an exterior release lever responding to an interior release lever being pulled. In this example, an occupant of the vehicle wants to open the canopy and therefore pulls on the interior release lever (1104*b*). The pulling motion on the interior release lever causes the floating control arm (1110*b*) to rotate (e.g., counterclockwise from this view). As described above, the pin (1100*b*) is retracted so that the pin does not impede the rotation of the floating control arm and the floating control arm can rotate past the point or level associated with the pin (1100*b*). The rotation of the floating control arm causes the torsion tube (1112*b*) to rotate which in turn causes the gear (1102*b*) to rotate to an open position (e.g., with the U-shaped receptor facing diagonally upward at a 45° angle). This allows the spring action of the canopy to open the canopy, as the canopy pin is no longer held in place by the gear (1102*b*). See FIG. 10B and FIG. 10A for a closer view of gear 1102*a* from FIG. 11A and gear 1102*b* from FIG. 11B, respectively.

In addition to opening the canopy, pulling the interior release lever causes the exterior release lever (1106*b*) to lift up. This may be attractive or otherwise desirable in some applications because the movement of the exterior release lever (in response to the canopy being opened using the interior release lever) signals to someone outside of the vehicle (e.g., to ground personnel coming to assist the occupant of the vehicle) that the canopy is about to open so that they are not injured by the opening of the canopy. A closer view of the bonded control arm (which is coupled to the exterior release lever as well as the torsion tubes and which causes the exterior release lever to lift up in response to the interior release lever as shown here) is described in more detail below.

Figure 11C:
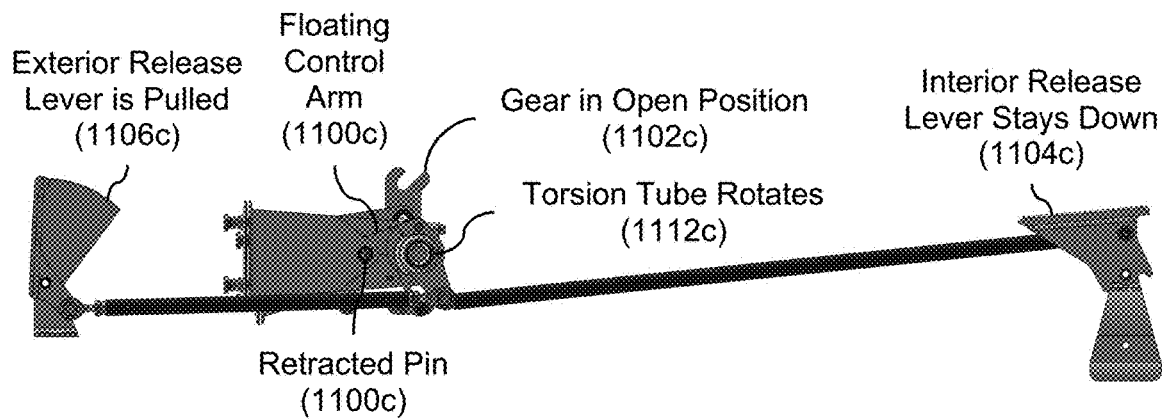
FIG. 11C is a diagram illustrating an embodiment of a side view of a locking system responding to an exterior release lever being pulled.

FIG. 11C is a diagram illustrating an embodiment of a side view of a locking system responding to an exterior release lever being pulled. As before, the pin (1100*c*) is retracted but in this example the exterior release lever (1106*c*) is pulled to open the canopy. The exterior release lever is coupled to a bonded control arm (shown in more detail below) which bypasses the pin (1100*c*) so that even if the pin were extended, the bonded control arm could still rotate. The rotation of the bonded control arm causes the torsion tube (1112*c*) to rotate which in turn causes the gear to rotate to the open position (1102*c*) shown here. The floating control arm (1100*c*) floats above the bonded control arm and the torsion tube so that the floating control arm will not rotate even if the bonded control arm and torsion tube are rotating. Since the floating control arm does not rotate, the interior release lever (1104*c*) stays down when the exterior release lever (1106*c*) is pulled. In some applications this is desirable to prevent damage to the interior release lever (e.g., it is easier to damage the lever if it is up) and/or to prevent hitting an occupant of the vehicle (e.g., the interior release lever is located near the armrest(s) between the two seats of the vehicle and could hit someone's elbow if their arm is resting on the armrest).

The following figure shows various views of a bonded control arm and a floating control arm.

Figure 12A:
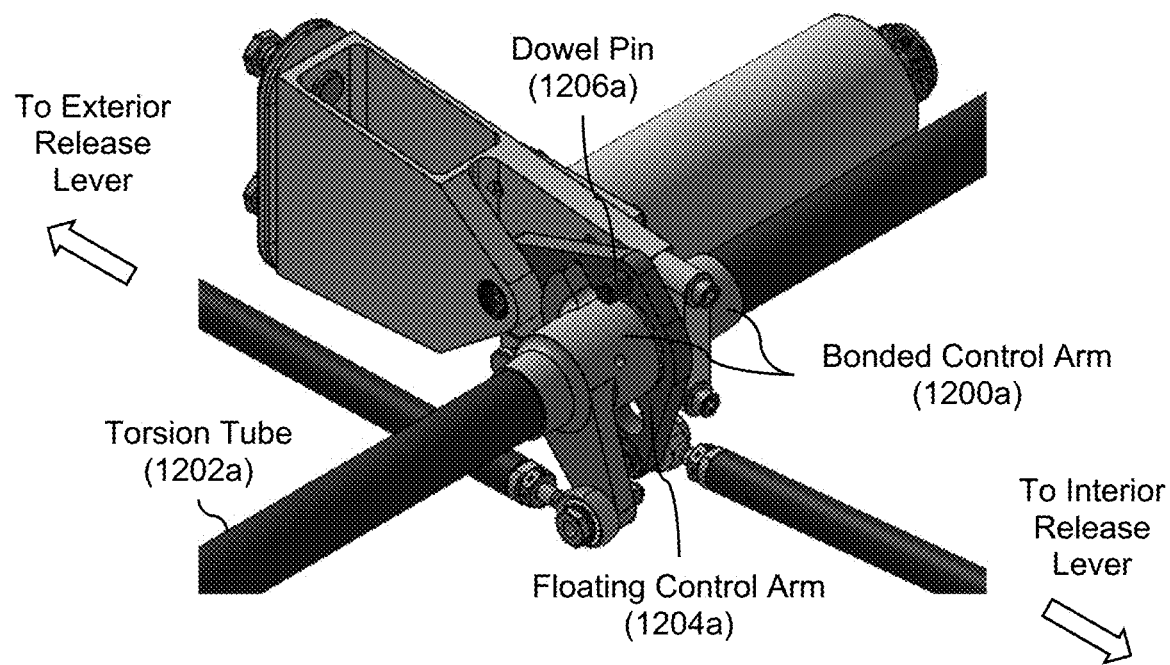
FIG. 12A is a perspective view showing an embodiment of a locking system which includes a bonded control arm and a floating control arm where an exterior release lever responds to an interior release lever but not vice versa.

FIG. 12A is a perspective view showing an embodiment of a locking system which includes a bonded control arm and a floating control arm where an exterior release lever responds to an interior release lever but not vice versa. As described above, the bonded control arm (1200*a*) is so named because it is glued or otherwise bonded to the torsion tube (1202*a*). The bonded control arm is also coupled to the exterior release lever. The floating control arm (1204*a*) floats (e.g., around the torsion tube and around the bonded control arm) and is coupled to the interior release lever.

When the interior release lever is pulled (assuming the system is unlocked), the floating control arm (1204*a*) will rotate. The dowel pin (1206*a*), which protrudes from the floating control arm, will also rotate and push against the extended tab of the bonded control arm (1200*a*). The rotation of the bonded control arm causes the exterior release lever to be pulled up in response to the hatch being opened by pulling on the interior release lever (i.e., when the solenoid-implemented lock is unlocked). Also, since the bonded control arm is bonded to the torsion tube (1202*a*), the rotation of the bonded control arm will also cause the latch (not shown) to open, permitting the hatch to spring open. In contrast, when the exterior latch lever is pulled, the bonded control arm (1200*a*) will rotate away from the dowel pin (1206*a*) so that the interior release lever is not pulled up in response to the hatch being opened by pulling on the exterior release lever.

Figure 12B:
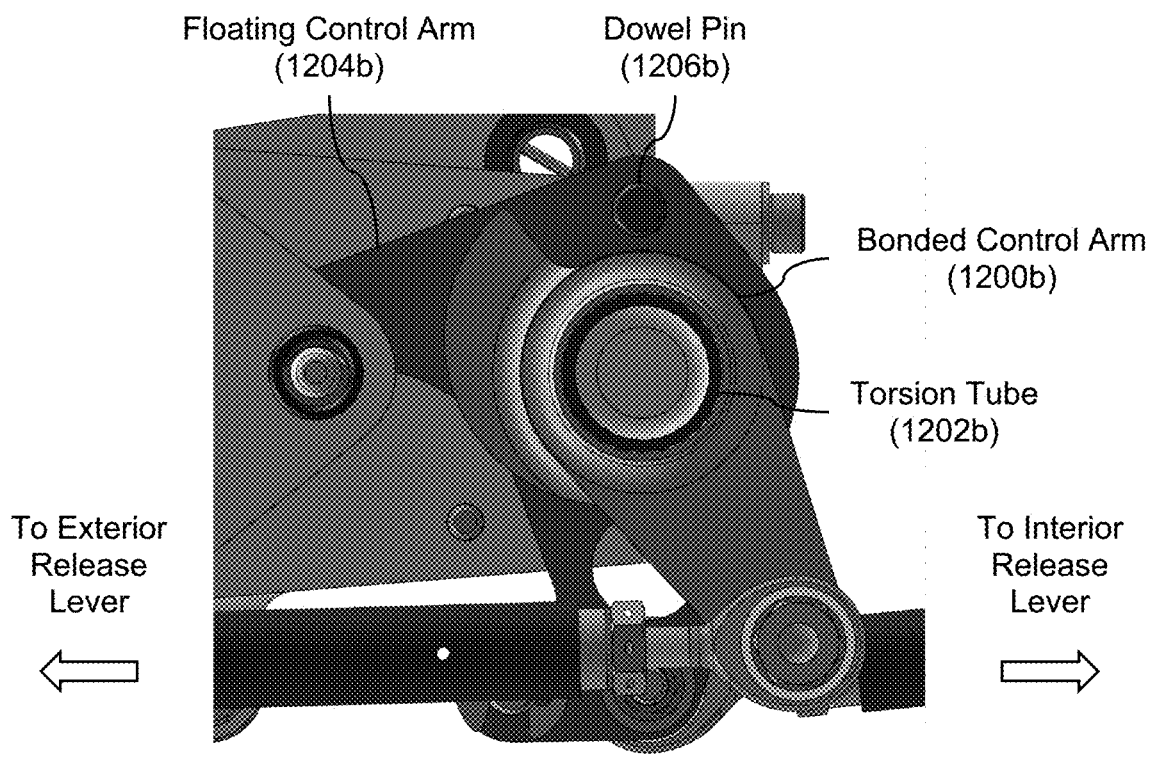
FIG. 12B is a side view showing an embodiment of a locking system which includes a bonded control arm and a floating control arm where an exterior release lever responds to an interior release lever but not vice versa.

FIG. 12B is a side view showing an embodiment of a locking system which includes a bonded control arm and a floating control arm where an exterior release lever responds to an interior release lever but not vice versa. In this example, the same bonded control arm (1200*b*), torsion tube (1202*b*), floating control arm (1204*b*), and dowel pin (1206*b*) from the previous figure are shown, but from a side view instead.

The following figures describe the examples above (e.g., where the exterior release lever moves in response to the interior release lever, but not vice versa) more formally and/or generally in flowcharts.

Figure 13:
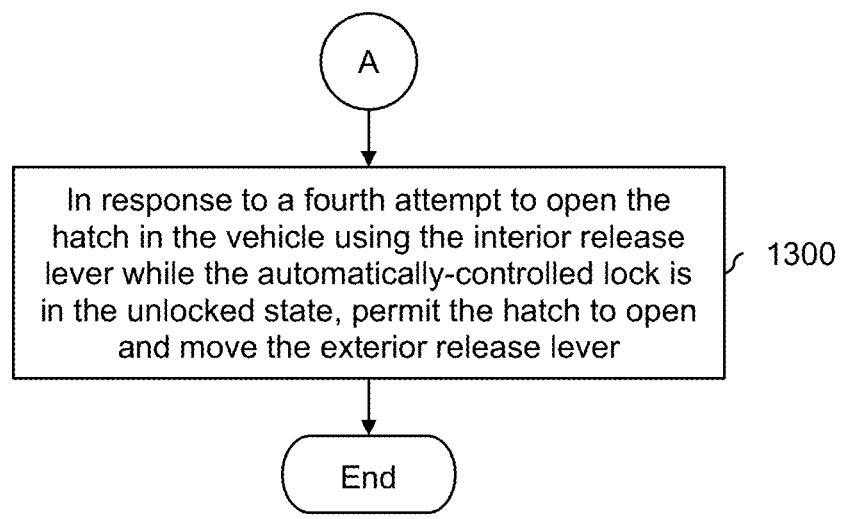
FIG. 13 is a flowchart illustrating an embodiment of a process where an exterior release lever moves in response to an interior release lever.

FIG. 13 is a flowchart illustrating an embodiment of a process where an exterior release lever moves in response to an interior release lever. In some embodiments, the process of FIG. 13 is performed in combination with the process of FIG. 1.

At 1300, in response to a fourth attempt to open the hatch in the vehicle using the interior release lever while the automatically-controlled lock is in the unlocked state, the hatch is opened and the exterior release lever is moved.

For example, in FIG. 11B, the pin is retracted (1100*b*) so that the lock is in an unlocked state. In response to the interior release lever (1104*b*) being pulled, the exterior release lever (1106*b*) lifts up. As described above, this may signal to someone outside of the vehicle that the canopy is about to open. See FIG. 12A and FIG. 12B for an example of the components which permit this interaction.

Figure 14:
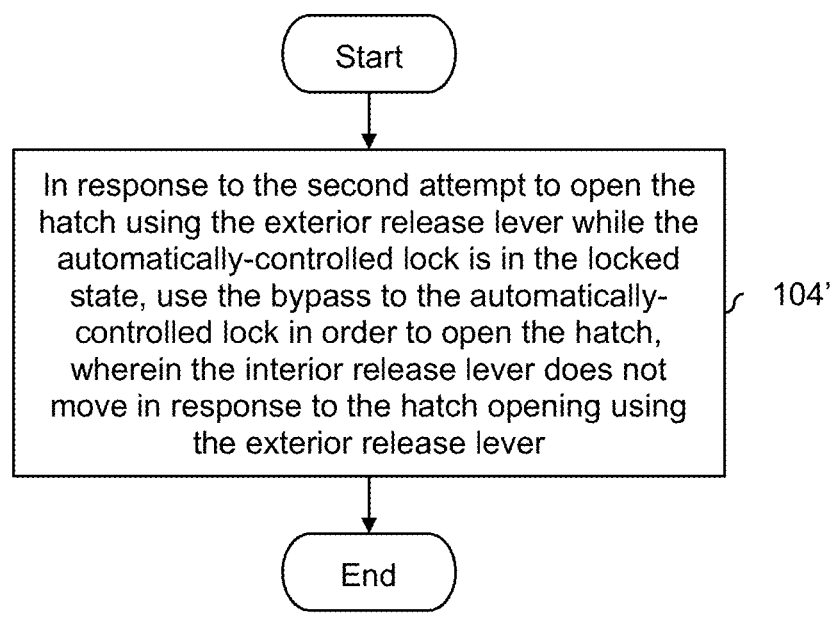
FIG. 14 is a flowchart illustrating an embodiment of a process to respond to a hatch opening using an exterior release lever.

FIG. 14 is a flowchart illustrating an embodiment of a process to respond to a hatch opening using an exterior release lever. In some embodiments, step 104 in FIG. 1 includes this process. At 104', in response to the second attempt to open the hatch using the exterior release lever while the automatically-controlled lock is in the locked state, the bypass to the automatically-controlled lock is used in order to open the hatch, wherein the interior release lever does not move in response to the hatch opening using the exterior release lever.

See, for example, FIG. 11C. Even though the exterior release lever (1106*c*) is pulled to open the hatch, the interior release lever (1104*c*) does not move. See FIG. 12A and FIG. 12B for an example of the components which permit this interaction (or lack thereof). It is noted that the interior release lever does not respond to the exterior release lever being pulled regardless of what state the lock is in (e.g., locked or unlocked).

As described above, in some applications, the vehicle (e.g., a two-seat VTOL aircraft) is flown autonomously. In some embodiments, the vehicle reports sensor information (e.g., related to a latching and/or locking system, some embodiments of which are described above) to an autonomous flight controller. The autonomous flight controller may use that information as part of a takeoff checklist to ensure that it is safe to take off (e.g., autonomously). The following figure shows one exemplary arrangement of a sensor and/or reporting component which may be desirable because it avoids duplicate and/or redundant wiring.

Figure 15:
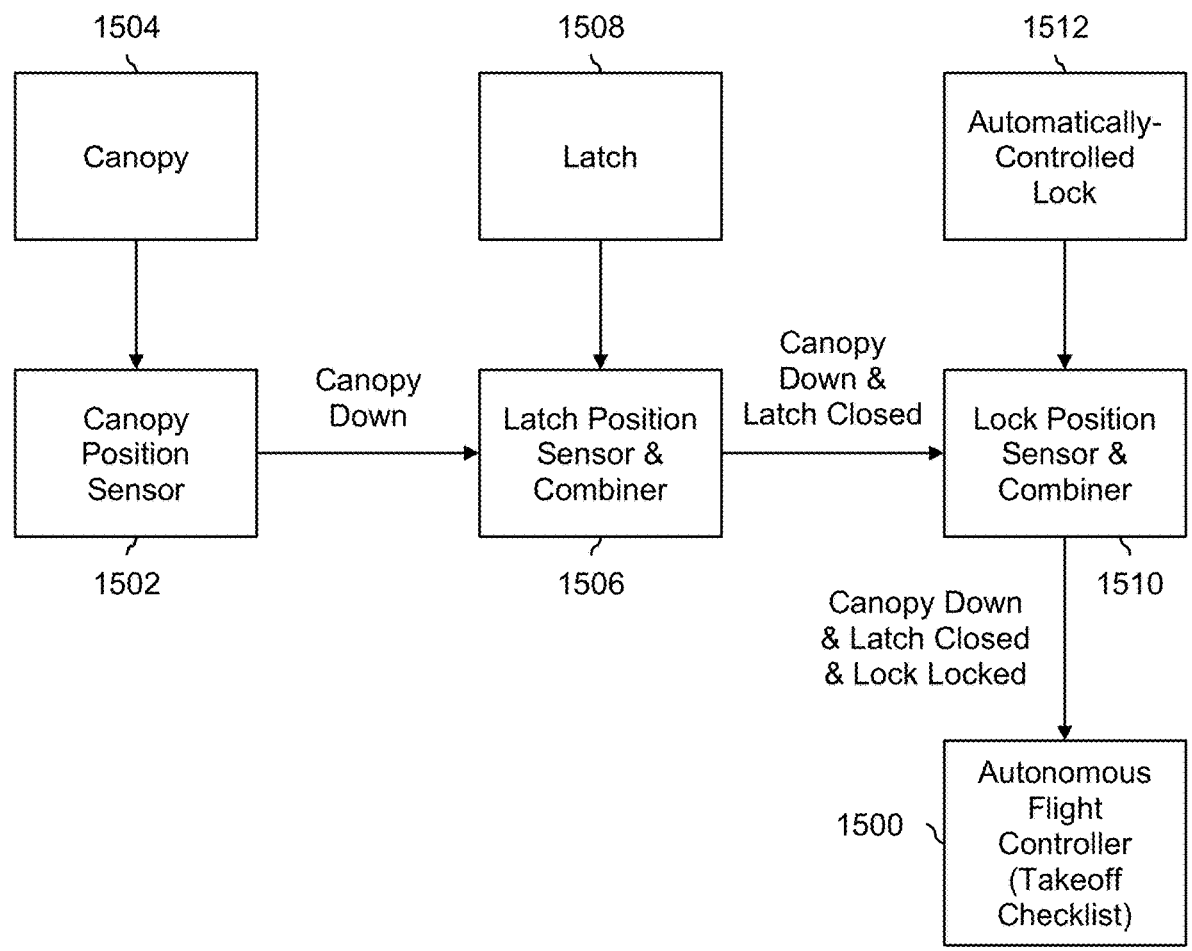
FIG. 15 is a diagram illustrating an embodiment of sensors in a vehicle that are used to report information to an autonomous flight controller.

FIG. 15 is a diagram illustrating an embodiment of sensors in a vehicle that are used to report information to an autonomous flight controller. In this example, the vehicle is an autonomous aircraft and the autonomous flight controller (1500) uses the reported information as part of a takeoff checklist to ensure that it is safe to take off. Naturally, the order or sequence of sensors/combiners shown here (e.g., canopy, then latch, then lock) is merely exemplary and is not intended to be limiting.

In this example, three requirements must be satisfied in order for the autonomous flight controller to decide that it is safe to take off. First, the canopy must be in a down position (e.g., as shown in FIG. 6A). Second, the latch must be in a closed position (see, e.g., FIG. 10B). Third, the lock (e.g., a solenoid-implemented lock which extends and retracts a pin) must be in a locked position.

To do this, a canopy position sensor (1502) senses the position of the canopy (1504) and outputs a canopy down signal (e.g., TRUE or 1 if the canopy is down, FALSE or 0 if the canopy is up). For example, there may be a bolt attached to the canopy frame (e.g., 650 in FIG. 6B) that comes down and trips a proximity sensor (e.g., a Hall effect sensor attached to the fuselage). Hall effect sensors are desirable in at least some applications (such as in a moving vehicle) because they are solid state devices, which are not affected by vibration or the force of gravity during maneuvers like a reed switch type sensor or other similar devices would.

The canopy down signal is then passed to a latch position sensor and combiner (1506). This component both senses the state of the latch (1508) and combines that signal with the canopy down signal and outputs a canopy down and latch closed signal. For example, this component (1506) may include latch position sensor 1006*a* and 1006*b* from FIG. 10A and FIG. 10B, respectively, which would report that the latch is open and closed, respectively. In some embodiments, sensors 1006*a*/1006*b* are implemented using Hall effect sensors or other proximity sensors. In order for that signal to be TRUE or 1, both the canopy must be down and the latch must be closed. If either condition is not sensed or otherwise reported, the signal output by sensor and combiner 1506 is FALSE or 0.

The canopy down and latch closed signal is then passed to a lock position sensor and combiner (1510) which senses the position of the automatically-controlled lock (1512) and combines that sensed value with the input signal (i.e., the canopy down and latch closed signal). For example, solenoid 900*c* in FIG. 9C and solenoid 900*d* in FIG. 9D may have a built-in sensor that reports that the pin (902*c* and 902*d*) is extended and retracted, respectively, in those examples. Alternatively, there may be some external sensors, such as another proximity sensor located near where the pin would be when extended. The output of sensor and combiner 1510 is therefore only TRUE or 1 when the canopy is down, the latch is closed, and the lock is locked. If one of those conditions is not satisfied, then the output signal is FALSE or 0. This signal is then passed to the autonomous flight controller (1500) which uses it as part of its takeoff checklist to ensure that it is safe to take off.

With an aircraft, redundancy and backups are an important design consideration. If purely sensing related components were used (e.g., without combining the sensed value with an input signal), then two (e.g., copies) of each sensor output would need to be routed from each sensor and passed to the autonomous flight controller to have sufficient redundancy and/or backup. In contrast, with the example components shown here, the amount of wiring is reduced. If any of the components fails, the signal reported to the autonomous flight controller (1500) will be FALSE or 0 and the autonomous flight controller will not take off.

The following figure describes this more generally and/or formally in a flowchart.

Figure 16:
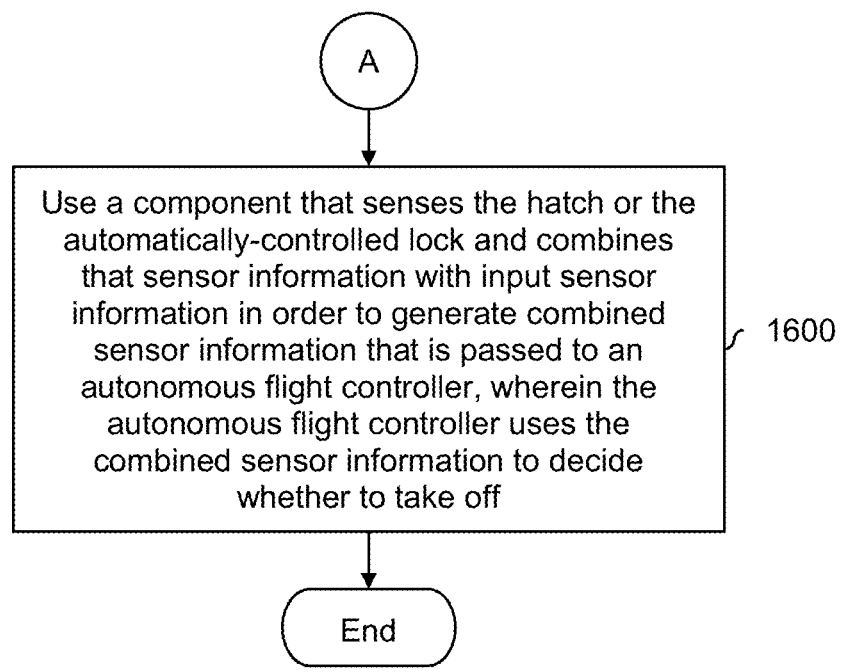
FIG. 16 is a flowchart illustrating an embodiment of a sensing and reporting process.

FIG. 16 is a flowchart illustrating an embodiment of a sensing and reporting process. As described above, in some embodiments (such as this one), the vehicle is an autonomous vehicle and the autonomous flight controller in the vehicle needs to input sensor information and decide when it is safe to take off (e.g., autonomously).

At 1600, a component that senses the hatch or the automatically-controlled lock and combines that sensor information with input sensor information is used in order to generate combined sensor information that is passed to an autonomous flight controller, wherein the autonomous flight controller uses the combined sensor information to decide whether to take off. As described above, using a component that both senses and combines that sensed information with some other sensor information (e.g., input to the component) reduces the amount of wiring which would otherwise be required for aircraft applications. See, for example, FIG. 15, where components 1506 and 1510 sense their respective part of the aircraft and combine that sensed information with other sensor information (e.g., from an earlier part of the cascade).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system provided in an aircraft, the system comprising:
   an interior release lever configured to open a hatch of the aircraft from an interior of the aircraft;
   an exterior release lever configured to open the hatch from an exterior of the aircraft;
   a locking system including:
      an automatically-controlled lock, comprising a solenoid, a pin, and a spring acting on the pin, coupled to the interior release lever, and configured to:
         in response to an attempt to open the hatch using the interior release lever, while the automatically-controlled lock is in a locked state, prevent the hatch from opening, and
         in an event of an emergency power loss while the aircraft is in a state of takeoff, cruising, or landing, where no power is supplied to the solenoid, such that no magnetic field is generated by the solenoid, thereby the spring causes the pin to be extended, putting the automatically-controlled lock in the locked state and keeping the hatch closed while the aircraft is in air;
      a bypass to the automatically-controlled lock coupled to the exterior release lever and configured to: in response to an attempt to open the hatch using the exterior release lever, while the automatically-controlled lock is in the locked state, bypass the automatically-controlled lock in order to open the hatch; and
   an autonomous flight controller configured to automatically control the automatically-controlled lock in the aircraft based at least in part on a state associated with the autonomous flight controller by:
      putting the automatically-controlled lock in the locked state when the autonomous flight controller is in a state of pre-flight, takeoff, cruising, or landing, wherein the hatch is prevented from opening using the interior release lever and is configured to be opened using the exterior release lever when the automatically-controlled lock is in the locked state; and
      putting the automatically-controlled lock in an unlocked state when the autonomous flight controller is in a post-flight state, wherein the hatch is configured to be opened using the interior release lever or the exterior release lever when the automatically-controlled lock is in the unlocked state.

2. The system recited in claim 1, wherein the hatch is in form of a door or a canopy.

3. The system recited in claim 1, wherein when the autonomous flight controller is in the state of takeoff, cruising, or landing, a motor signal associated with a motor in the aircraft indicates that the motor is accelerating; and when the autonomous flight controller is in the post-flight state, the motor signal indicates that the motor is off.

4. The system recited in claim 1, wherein:
   the automatically-controlled lock is put into the locked state by not supplying power to the solenoid so that no magnetic field is generated by the solenoid and the spring causes the pin to be extended; and
   the automatically-controlled lock is put into the unlocked state by supplying power to the solenoid so that a magnetic field is generated by the solenoid that retracts the pin and compresses the spring.

5. The system recited in claim 1, wherein the bypass is further configured to: in response to an attempt to open the hatch using an interior emergency lever while the automatically-controlled lock is in the locked state, bypass the automatically-controlled lock in order to open the hatch.

6. The system recited in claim 1, wherein the automatically-controlled lock is further configured to: in response to an attempt to open the hatch in the aircraft using the interior release lever while the automatically-controlled lock is in the unlocked state, permit the hatch to open and move the exterior release lever.

7. The system recited in claim 1, wherein the interior release lever does not move in response to the hatch opening using the exterior release lever.

8. The system of claim 1, further comprising:
   a first latch coupled to the locking system via a first torsion tube, wherein rotation of the first torsion tube releases the first latch; and
   a second latch coupled to the locking system via a second torsion tube, wherein rotation of the second torsion tube releases the second latch;
   wherein the exterior release lever is coupled to the first torsion tube and the second torsion tube via the bypass such that the exterior release lever is configured to rotate the first torsion tube and the second torsion tube when the automatically-controlled lock is in the locked state, thereby opening the hatch.

9. The system of claim 8, further comprising:
   an interior emergency release lever configured to open the hatch from the interior of the aircraft,
   wherein the interior emergency release lever is coupled to the first torsion tube and the second torsion tube via the bypass such that the interior emergency release lever is configured to rotate the first torsion tube and the second torsion tube when the automatically-controlled lock is in the locked state.

10. The system of claim 1, wherein power is supplied to an electrical system of the aircraft when the autonomous flight controller is in any one of the states of pre-flight, takeoff, cruising, or landing.

11. A method, comprising:
automatically controlling an automatically-controlled lock, comprising a solenoid, a pin, and a spring acting on the pin, in an aircraft based at least in part on a state associated with an autonomous flight controller of the aircraft by:
putting the automatically-controlled lock in a locked state when the autonomous flight controller is in a state of pre-flight, takeoff, cruising, or landing, and
putting the automatically-controlled lock in an unlocked state when the autonomous flight controller is in a post-flight state;
while the automatically-controlled lock is in the locked state, and the autonomous flight controller is in the state of pre-flight:
controlling the automatically-controlled lock to prevent a hatch of the aircraft from opening in response to an attempt to open the hatch using an interior release lever; and
opening the hatch in response to actuation of a bypass using an exterior release lever to bypass the locked state of the automatically-controlled lock,
wherein in an event of an emergency power loss while the aircraft is in the state of takeoff, cruising, or landing, where no power is supplied to the solenoid, such that no magnetic field is generated by the solenoid, thereby the spring causes the pin to be extended, putting the automatically-controlled lock in the locked state and keeping the hatch closed while the aircraft is in air.

12. The method recited in claim 11, wherein the hatch is in form of a door or a canopy.

13. The method recited in claim 11, wherein when the autonomous flight controller is in the state of takeoff, cruising, or landing,
a motor signal associated with a motor in the aircraft indicates that the motor is accelerating; and
when the autonomous flight controller is in the post-flight state, the motor signal indicates that the motor is off.

14. The method recited in claim 11, wherein:
the automatically-controlled lock is put into the locked state by not supplying power to the solenoid so that no magnetic field is generated by the solenoid and the spring causes the pin to be extended; and
the automatically-controlled lock is put into the unlocked state by supplying power to the solenoid so that a magnetic field is generated by the solenoid that retracts the pin and compresses the spring.

15. The method recited in claim 11, wherein the bypass is further configured to: in response to an attempt to open the hatch using an interior emergency lever while the automatically-controlled lock is in the locked state, bypass the automatically-controlled lock in order to open the hatch.

16. The method recited in claim 11, wherein the automatically-controlled lock is further configured to: in response to an attempt to open the hatch in the aircraft using the interior release lever while the automatically-controlled lock is in the unlocked state, permit the hatch to open and move the exterior release lever.

17. The method recited in claim 11, wherein the interior release lever does not move in response to the hatch opening using the exterior release lever.

18. The method of claim 11, wherein power is supplied to an electrical system of the aircraft when the autonomous flight controller is in any one of the states of pre-flight, takeoff, cruising, or landing.

19. A system provided in an aircraft, the system comprising:
an interior release lever configured to open a hatch of the aircraft from an interior of the aircraft;
an exterior release lever configured to open the hatch from an exterior of the aircraft;
a locking system including:
an automatically-controlled lock, comprising a solenoid, a pin, and a spring acting on the pin, coupled to the interior release lever, and configured to:
in response to an attempt to open the hatch using the interior release lever, while the automatically-controlled lock is in a locked state, prevent the hatch from opening,
a bypass to the automatically-controlled lock coupled to the exterior release lever and configured to: in response to an attempt to open the hatch using the exterior release lever, while the automatically-controlled lock is in the locked state, bypass the automatically-controlled lock in order to open the hatch;
a first latch coupled to the locking system via a first torsion tube, wherein rotation of the first torsion tube releases the first latch; and
a second latch coupled to the locking system via a second torsion tube, wherein rotation of the second torsion tube releases the second latch;
wherein the exterior release lever is coupled to the first torsion tube and the second torsion tube via the bypass such that the exterior release lever is configured to rotate the first torsion tube and the second torsion tube when the automatically-controlled lock is in the locked state, thereby opening the hatch, and
an autonomous flight controller configured to automatically control the automatically-controlled lock in the aircraft based at least in part on a state associated with the autonomous flight controller by:
putting the automatically-controlled lock in the locked state when the autonomous flight controller is in a state of pre-flight, takeoff, cruising, or landing, wherein the hatch is prevented from opening using the interior release lever and is configured to be opened using the exterior release lever when the automatically-controlled lock is in the locked state; and
putting the automatically-controlled lock in an unlocked state when the autonomous flight controller is in a post-flight state, wherein the hatch is configured to be opened using the interior release lever or the exterior release lever when the automatically-controlled lock is in the unlocked state.

* * * * *